United States Patent
Sung et al.

(10) Patent No.: US 9,930,211 B2
(45) Date of Patent: Mar. 27, 2018

(54) IMAGE ACQUISITION APPARATUS AND IMAGE FORMING APPARATUS

(71) Applicant: S-PRINTING SOLUTION CO., LTD., Suwon-si, Gyeonggi-do (KR)

(72) Inventors: Byung Jun Sung, Seoul (KR); Sung Hyun Yoon, Suwon-si (KR); Seok Ho Kim, Yongin-si (KR)

(73) Assignee: S-PRINTING SOLUTION CO., LTD., Suwon (KR)

( * ) Notice: Subject to any disclaimer, the term of this patent is extended or adjusted under 35 U.S.C. 154(b) by 0 days.

(21) Appl. No.: 15/332,061

(22) Filed: Oct. 24, 2016

(65) Prior Publication Data
US 2017/0214826 A1    Jul. 27, 2017

(30) Foreign Application Priority Data
Jan. 22, 2016 (KR) .................. 10-2016-0007942

(51) Int. Cl.
*H04N 1/00* (2006.01)
*H04N 1/387* (2006.01)
*H04N 1/40* (2006.01)
*G06K 15/00* (2006.01)

(52) U.S. Cl.
CPC ....... *H04N 1/3876* (2013.01); *H04N 1/00251* (2013.01); *H04N 1/40068* (2013.01); *H04N 2201/0084* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,511,148 A | 4/1996 | Wellner | |
| 6,101,265 A * | 8/2000 | Bacus | G01N 15/1475 345/665 |
| 6,610,992 B1 | 8/2003 | Macaulay et al. | |
| 6,771,396 B1 | 8/2004 | Cheatle et al. | |
| 2002/0090127 A1 * | 7/2002 | Wetzel | G01B 7/003 382/133 |
| 2004/0258327 A1 | 12/2004 | Cheatle et al. | |
| 2005/0219648 A1 | 10/2005 | Takeyama | |
| 2009/0046192 A1 | 2/2009 | Molnar et al. | |
| 2011/0063449 A1 | 3/2011 | Lee | |
| 2013/0083176 A1 | 4/2013 | Kasahara | |
| 2013/0120616 A1 | 5/2013 | Yahata | |

OTHER PUBLICATIONS

International Search Report dated Mar. 28, 2017 in International Patent Application No. PCT/KR2016/014619.

* cited by examiner

*Primary Examiner* — Dov Popovici
(74) *Attorney, Agent, or Firm* — Staas & Halsey LLP

(57) ABSTRACT

An apparatus includes a main body having a stage on which an object to be scanned is supported; a camera module that acquires partial images by photographing a part of the object to be scanned; a rotational body in which the camera module is installed and which is rotatably provided; a driving unit that controls a rotational motion of the rotational body; and an image processing unit that forms a synthesized image by synthesizing the partial images acquired by the camera module, the apparatus capable of acquiring an image with high resolution.

19 Claims, 27 Drawing Sheets

IMAGE ACQUISITION APPARATUS AND IMAGE FORMING APPARATUS

CROSS-REFERENCE TO RELATED APPLICATIONS

This application claims the priority benefit of Korean Patent Application No. 10-2016-0007942, filed on Jan. 22, 2016 in the Korean Intellectual Property Office, the disclosure of which is incorporated herein by reference.

BACKGROUND

1. Field

The following description relates to an image acquisition apparatus using a camera module and an image forming apparatus.

2. Description of the Related Art

Image acquisition apparatuses read images formed on an object and convert the images into digital signals. Representative examples of the image acquisition apparatuses include cameras, camcorders, and scanners.

Image acquisition apparatuses may include facsimiles that transmit acquired image data through a communication network and then restore the image data, and copying machines and printers that print acquired image data on a printing medium. In this case, the facsimiles, the copying machines, and the printers may also be referred to as image forming apparatuses in the form of multi-function peripherals (MFPs).

The image acquisition apparatuses read images using a line image sensor or a two-dimensional image sensor. The line image sensor has a structure in which imaging devices for detecting light to generate electric charges are arranged in a line, and an image acquisition apparatus having a line image sensor acquires images in a predetermined area by moving the line image sensor and scanning light in a direction perpendicular to the direction of movement.

The two-dimensional image sensor, having a structure in which imaging devices are arranged in two dimensions, may acquire the entire image through one photographing operation. However, because the two-dimensional image sensor receives light by transmitting light reflected from the object through red, green, and blue color filters, it is relatively disadvantageous for acquiring images with high quality.

SUMMARY

Therefore, it is an aspect of the present disclosure to provide an image acquisition apparatus capable of acquiring an image with high resolution and an image forming apparatus capable of printing an image with high resolution on a printing medium.

Additional aspects of the invention will be set forth in part in the description which follows and, in part, will be obvious from the description, or may be learned by practice of the invention.

In accordance with an aspect of the present disclosure, an image acquisition apparatus includes: a main body having a stage on which an object to be scanned is put such that a surface of which an image is to be acquired faces upward; a preview camera module provided at an upper portion of the stage for acquiring a preview image of the object to be scanned; at least one main camera module provided at the upper portion of the stage to be rotated about a rotation axis, photograph the object to be scanned a plurality of times while rotating, and acquire a plurality of partial images of the object to be scanned frame by frame; and an image processing unit that acquires an entire image by synthesizing the plurality of partial images acquired frame by frame by the at least one main camera module.

The image acquisition apparatus may include: a rotational body rotatably provided at the upper portion of the stage to support the at least one main camera module; and a driving unit that generates a driving force to drive the rotational body.

The stage may include a support surface which is flatly formed to support the object to be scanned, and a rotation axis of the rotational body is perpendicular to the support surface.

While the rotational body rotates in one direction from a home position toward a final position, the main camera module may photograph the object to be scanned a plurality of times, and when the rotational body reaches the final position, the rotational body may rotate in the opposite direction to return to the home position.

While the main camera module is photographing the object to be scanned, the rotational body may be stopped.

At least a part of each of the plurality of partial images acquired by the main camera module may overlap one another.

Each of the preview camera module and the camera module may include a two-dimensional image sensor in which imaging devices for detecting light are arranged in two dimensions.

The driving unit may include a motor for generating a rotational force and a power transfer member that transfers the rotational force of the motor to the rotational body.

The main body may include a base portion provided at the upper portion of the stage to support the rotational body.

The image acquisition apparatus may include a rail member that guides a rotational motion of the rotational body.

The image acquisition apparatus may include a roller member installed on the rotational body to roll on the rail member.

The image acquisition apparatus may include an angle sensing unit for sensing a rotational angle of the rotational body.

The angle sensing unit may include a variable resistor whose resistance value varies according to the rotational angle of the rotational body.

The image acquisition apparatus may include a home position sensing unit for sensing whether the rotational body is located at a home position.

The home position sensing unit may include an emitter that emits light and a photointerrupter having a receiver that receives light emitted from the emitter.

The image acquisition apparatus may include a plurality of illumination units that irradiate light on the object to be scanned, and at least a part of the plurality of illumination units is installed at the rotational body.

The image processing unit may synthesize the partial images acquired by the main camera module using a stitching algorithm.

In accordance with an aspect of the present disclosure, an image acquisition apparatus includes: a stage having a support surface on which an object to be scanned is supported; a rotational body that rotates about a rotation axis perpendicular to the support surface at an upper portion of the stage; and at least one main camera module installed at an eccentric position with respect to the rotation axis of the rotational body to acquire a plurality of partial images of the object to be scanned frame by frame by photographing a part of the object to be scanned while the rotational body rotates.

The at least one main camera module may include a plurality of main camera modules, and the plurality of main camera modules may be arranged in a radial direction.

At least a part of partial images acquired by each of the plurality of main camera modules may overlap one another.

The image acquisition apparatus may include a preview camera module that acquires an entire preview image of the object to be scanned by photographing the entire object to be scanned.

The preview camera module may be installed on the rotation axis of the rotational body.

In accordance with an aspect of the present disclosure, an image forming apparatus includes: a stage on which an object to be scanned is supported; a camera module that is rotatably provided on the stage and acquires a plurality of partial images of the object to be scanned frame by frame by photographing a part of the object to be scanned; an image processing unit that forms a synthesized image by synthesizing the plurality of partial images acquired by the camera module; and a printing unit that prints the synthesized image formed by the image processing unit on a recording medium.

The image forming apparatus may include a rotational body in which the camera module is installed and rotatably provided.

The image forming apparatus may include a driving unit that controls a rotational motion of the rotational body.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
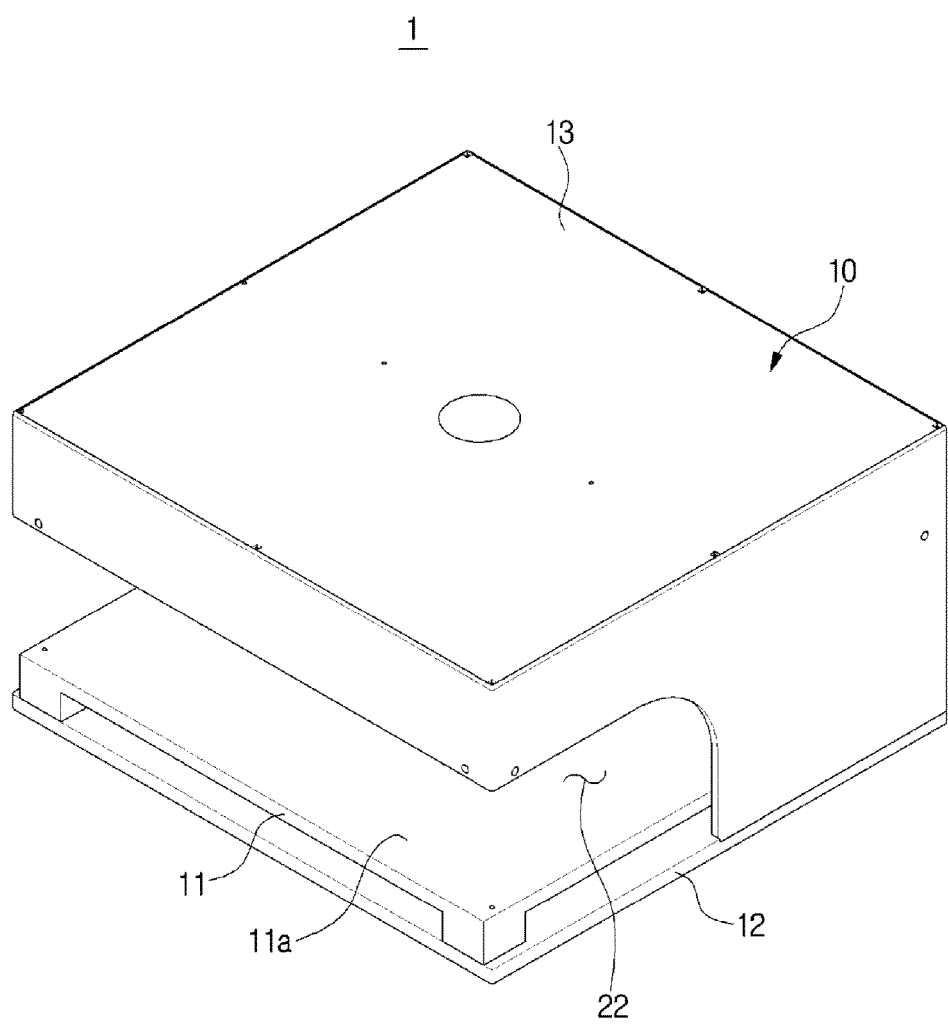
FIG. 1 is a perspective view of an image acquisition apparatus in accordance with an embodiment of the present disclosure.

Reference will now be made in detail to the embodiments of the present disclosure, examples of which are illustrated in the accompanying drawings, wherein like reference numerals refer to like elements throughout.

Figure 2:
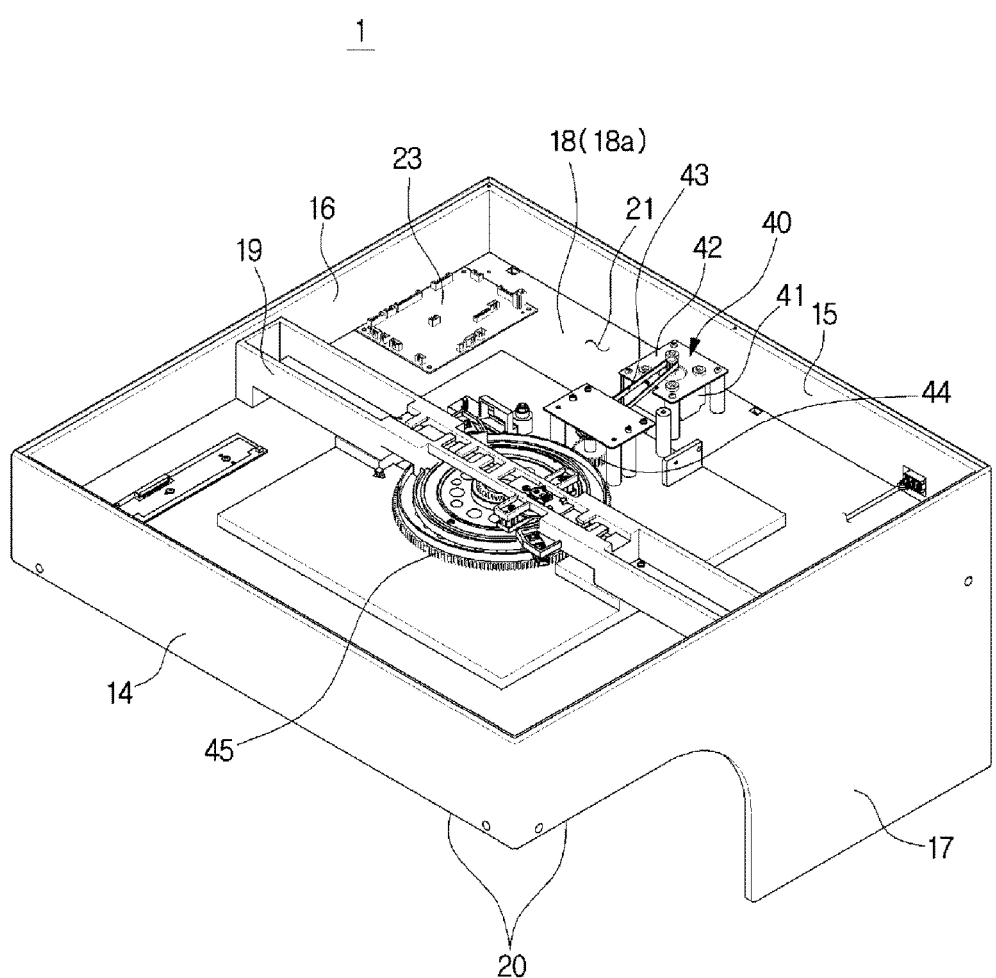
FIG. 2 is a view illustrating a state of an image acquisition apparatus of FIG. 1 from which an upper cover, a stage, and a bottom portion are removed.
Figure 3:
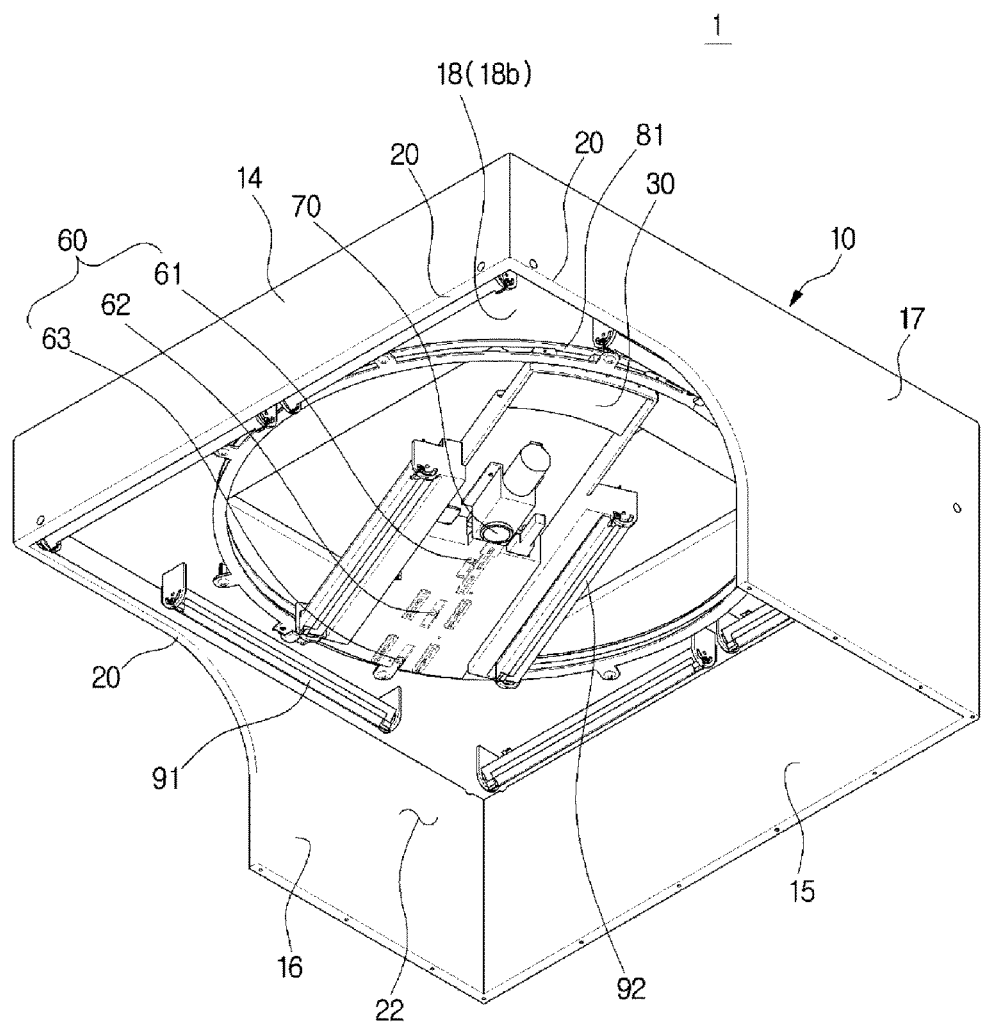
FIG. 3 is a bottom perspective view of the image acquisition apparatus of FIG. 2.
Figure 4:
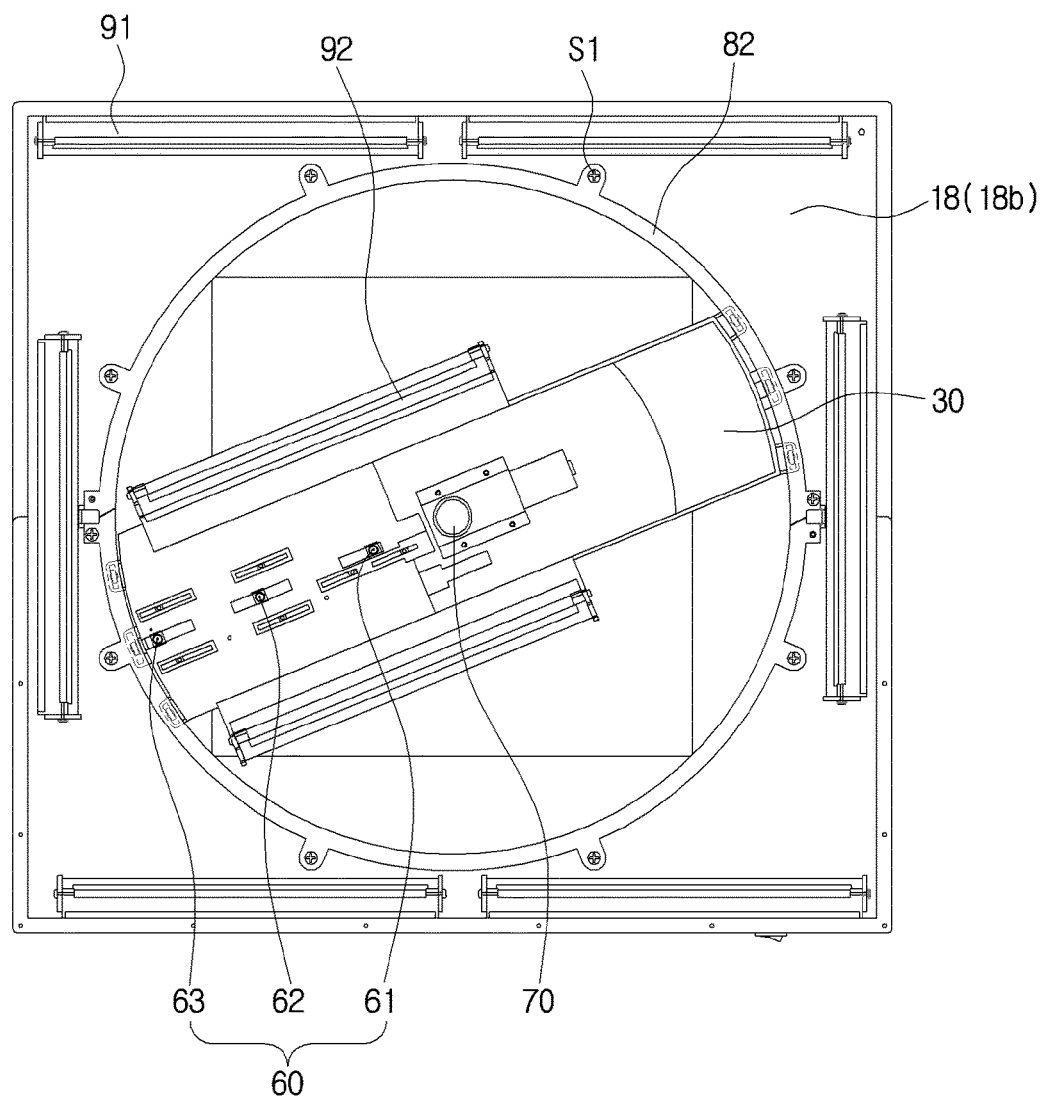
FIG. 4 is a bottom view of the image acquisition apparatus of FIG. 2.
Figure 5:
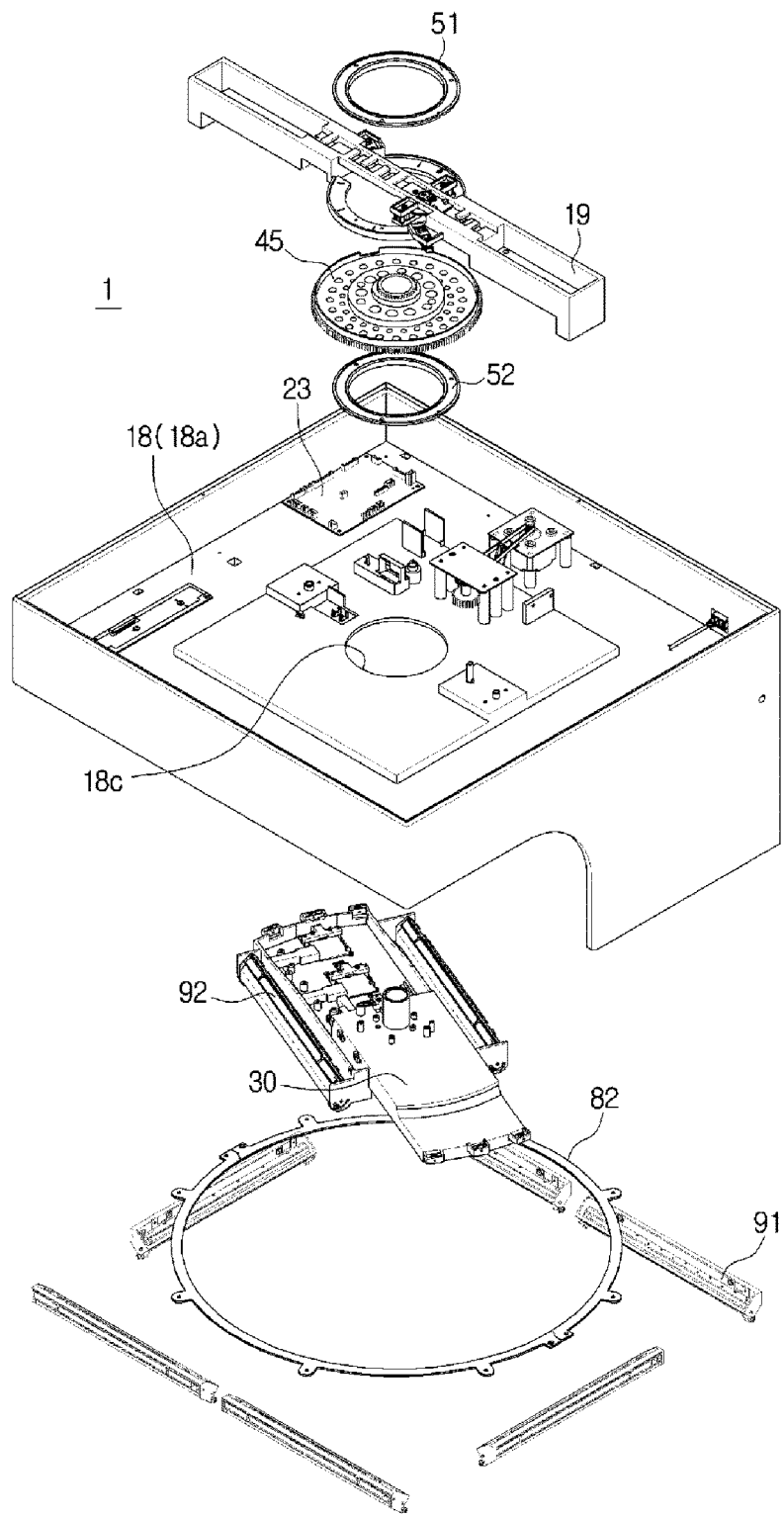
FIG. 5 is an exploded view of a detailed configuration of the image acquisition apparatus of FIG. 2.
Figure 6:
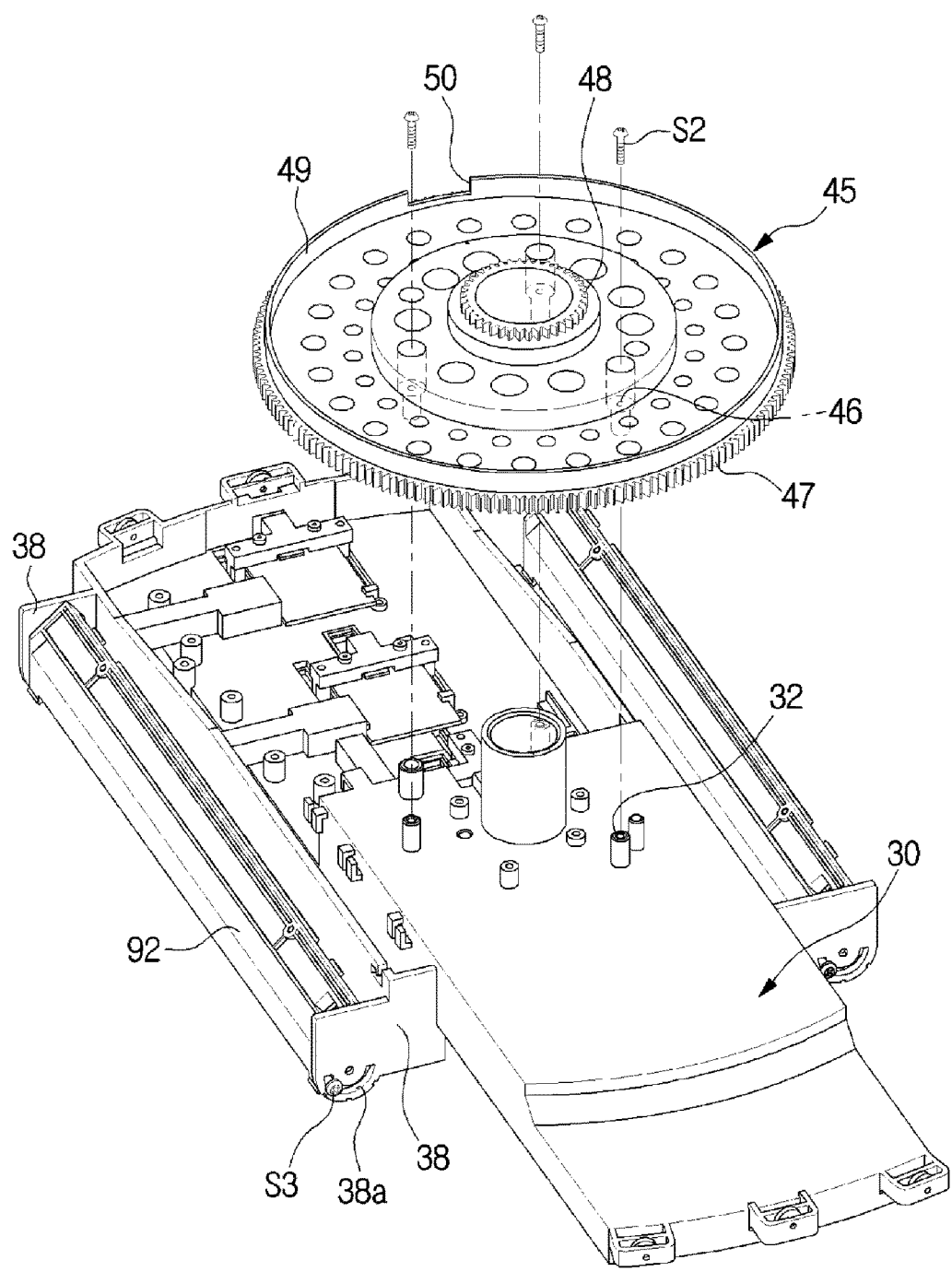
FIG. 6 is a view illustrating a structure in which a support gear and a rotational body of the image acquisition apparatus of FIG. 1 are combined with each other.
Figure 7:
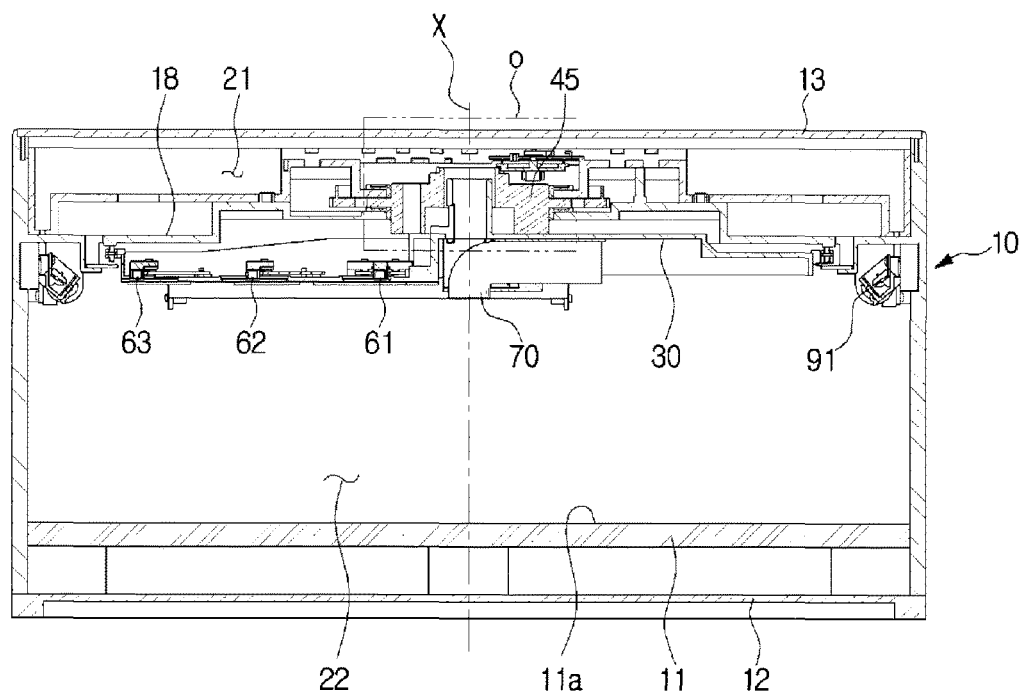
FIG. 7 is a cross-sectional view of the image acquisition apparatus of FIG. 1.
Figure 8:
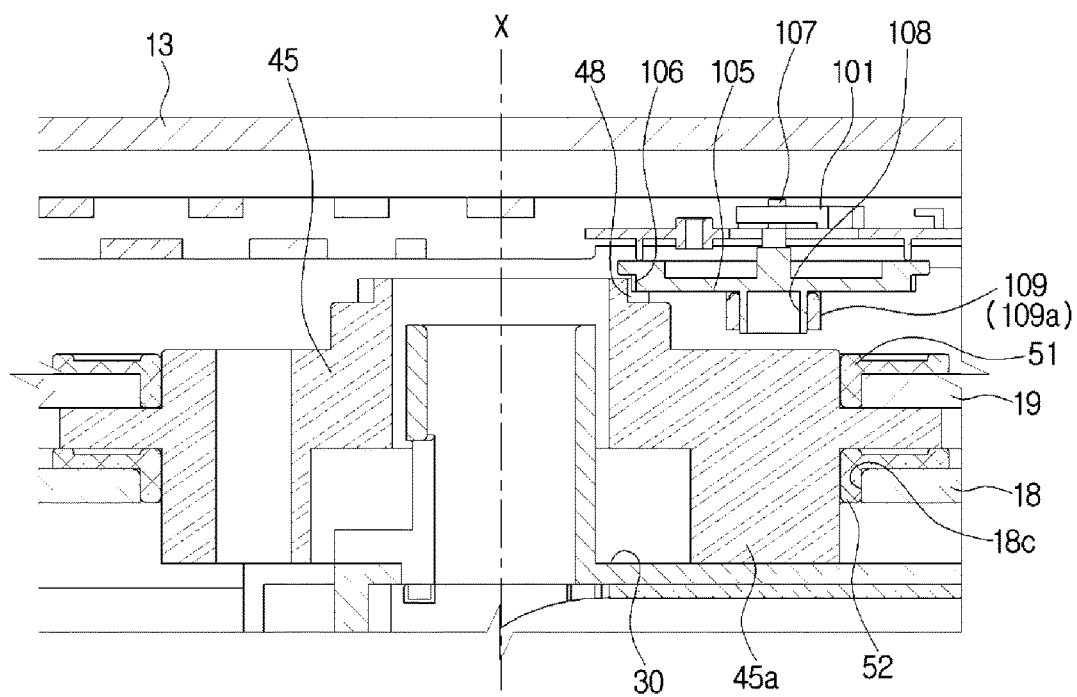
FIG. 8 is an enlarged view of portion O of FIG. 7.
Figure 9:
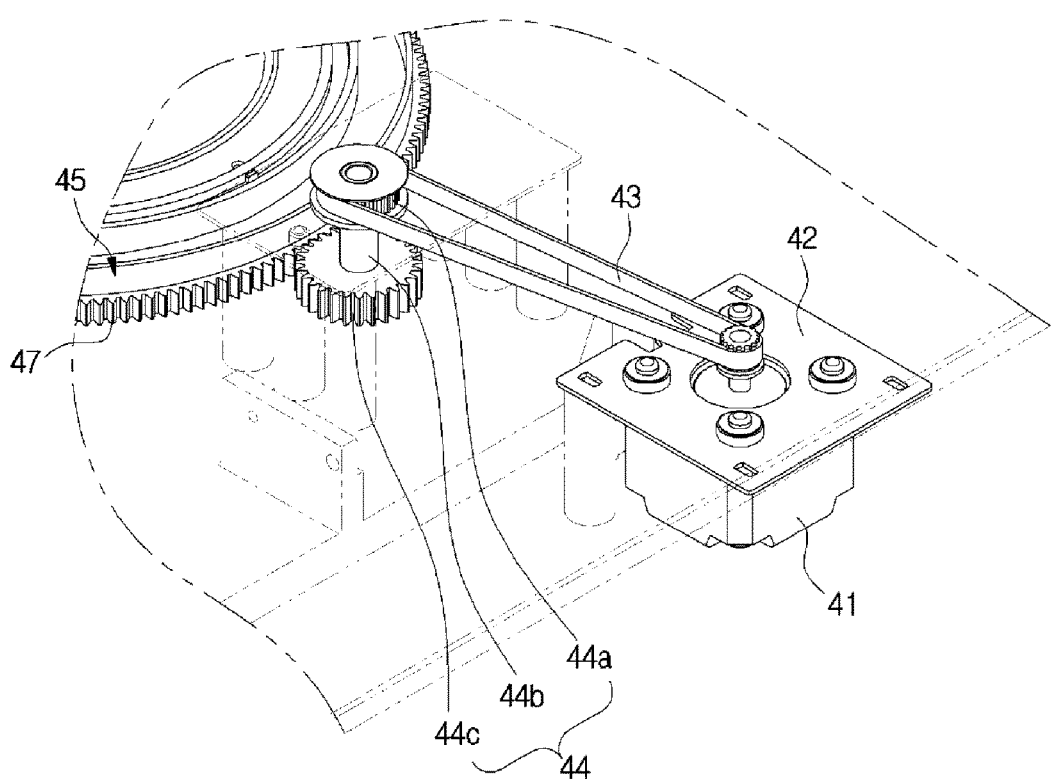
FIG. 9 is a view of a driving unit of the image acquisition apparatus of FIG. 1.

FIG. 1 is a perspective view of an image acquisition apparatus in accordance with an embodiment of the present disclosure, FIG. 2 is a view illustrating a state of the image acquisition apparatus of FIG. 1 from which an upper cover, a stage, and a bottom portion are removed, FIG. 3 is a bottom perspective view of the image acquisition apparatus of FIG. 2, FIG. 4 is a bottom view of the image acquisition apparatus of FIG. 2, FIG. 5 is an exploded view of a detailed configuration of the image acquisition apparatus of FIG. 2, FIG. 6 is a view illustrating a structure in which a support gear and a rotational body of the image acquisition apparatus of FIG. 1 are combined with each other, FIG. 7 is a cross-sectional view of the image acquisition apparatus of FIG. 1, FIG. 8 is an enlarged view of portion O of FIG. 7, and FIG. 9 is a view of a driving unit of the image acquisition apparatus of FIG. 1.

Referring to FIGS. 1 through 9, an image acquisition apparatus 1 may include a main body 10, camera modules 60 and 70 that acquire images of an object to be scanned, a rotational body 30 for rotating the camera module 60, and a driving unit 40 for driving the rotational body 30. The camera modules 60 and 70 may be installed in the rotational body 30.

Also, the image acquisition apparatus 1 may include an angle sensing unit 100 that senses a rotational angle of the rotational body 30 and a home position sensing unit 110 that senses whether the rotational body 30 is located at a home position. Also, the image acquisition apparatus 1 may further include rail members 81 and 82 that support the rotational body 30 and guide a rotational motion of the rotational body 30 as well as illumination units 91 and 92 that irradiate light on an object to be scanned.

The main body 10 may include a base portion 18 that partitions an upper electric space 21 and a lower photographing space 22, a front wall portion 14, a rear wall portion 15, a left wall portion 16, and a right wall portion 17 which are disposed in the front, back, right and left portions of the base portion 18, a stage 11 provided at a lower portion of the base portion 18 on which the object to be scanned can be put, and a bottom portion 12 supported on a table, a floor, etc. A top surface of the electric space 21 may be provided open, and the open top surface may be covered by an upper cover 13.

A slot 20 may be formed where parts of the front wall portion 14, the left wall portion 16, and the right wall portion 17 are cut so that the object to be scanned can be put on or removed from the stage 11 through the slot 20.

The object to be scanned is an object from which an image is to be acquired. For example, the object to be scanned may include a piece of paper, a book, etc in which various letters, symbols, numbers, figures, pictures, etc. are described, illustrated, or printed with at least one color.

The object to be scanned may be put on a support surface 11a of the stage 11 so that a surface of the object to be scanned from which an image is to be acquired faces the base portion 18.

The driving unit 40 for driving the rotational body 30 and a circuit board 23 for controlling components of the image acquisition apparatus 1 may be mounted on a top surface 18a of the base portion 18. Also, the angle sensing unit 100 and a bridge 19 in which the home position sensing unit 110 is installed may be mounted on the top surface 18a of the base portion 18.

The rotational body 30 having the camera modules 60 and 70 installed therein may be disposed at a lower portion of the base portion 18. The rotational body 30 may be rotatably provided. A rotation axis X of the rotational body 30 may be perpendicular to the support surface 11a of the stage 11. That is, the rotational body 30 may rotate on a plane horizontal with respect to the support surface 11a of the stage 11.

The illumination unit 91 may be installed at a bottom surface 18b of the base portion 18 so as to irradiate light on the object to be scanned. The illumination unit 91 may include a light source for generating light and a light source mount on which the light source is mounted.

The type of the light source is not limited. For example, the light source may include an incandescent lamp, a halogen lamp, a fluorescent lamp, a sodium lamp, a mercury lamp, a fluorescent mercury lamp, a xenon lamp, an arc lamp, a neon tube lamp, an electroluminescent (EL) lamp, a light emitting diode (LED), or an external electrode fluorescent lamp (EEFL).

At least one illumination unit 91 may be installed at each of front, back, left, and right edges of the bottom surface 18b of the base portion 18. However, the illumination unit 92 may be installed at the rotational body 30 as well as the base portion 18. The illumination unit 92 installed at the rotational body 30 may be rotated together with the rotational body 30.

Thus, the illumination unit 91 installed at the bottom surface 18b of the base portion 18 may be referred to as a fixed illumination unit, and the illumination unit 92 installed at the rotational body 30 may be referred to as a movable illumination unit.

The fixed illumination unit 91 and the movable illumination unit 92 may be turned on together or separately as needed. Also, each fixed illumination unit 91 installed at each edge of the bottom surface 18b of the base portion 18 may be turned on together or separately depending on the position of the rotational body 30.

The rail member 82 that supports the rotational body 30 and guides a rotational motion of the rotational body 30 may be installed at the bottom surface 18b of the base portion 18. A roller member 36 installed at the rotational body 30 may make rolling motions on the rail members 81 and 82.

The rail members 81 and 82 may have a circular or an arc shape so as to guide the rotational motion of the rotational body 30.

The rail members 81 and 82 may include a first rail member 81 and a second rail member 82 located below the first rail member 81. The roller member 36 of the rotational body 30 may be located between the first rail member 81 and the second rail member 82.

The first rail member 81 may be in close contact with the bottom surface 18b of the base portion 18. The first rail member 81 may be formed as a single body with the base portion 18.

The second rail member 82 may be disposed to be slightly spaced apart from the bottom surface 18b of the base portion 18. The second rail member 82 may be disposed separately from the base portion 18 and may be fastened to the base portion 18 using a fastening member S1. Here, the fastening member S1 includes various types of mechanical coupling elements including a screw, a pin, a rivet, a bolt, etc.

The camera modules 60 and 70 may be installed at the rotational body 30, may rotate together with the rotational body 30, and may acquire an image of the object to be scanned. The camera modules 60 and 70 may include a main camera module 60 that acquires a synthesized image with high quality by synthesizing a plurality of partial images acquired by photographing a part of the object to be scanned a plurality of times and a preview camera module 70 that acquires a preview image by photographing the whole of the object to be scanned at once.

The main camera module 60 provided to acquire the entire image of the object to be scanned by photographing a part of the object to be scanned a plurality of times may have a relatively smaller number of pixels than that of the preview camera module 70 that acquires the entire image of the object to be scanned by photographing the whole of the object to be scanned at once.

The main camera module 60 includes an image sensor having imaging devices that detect light reflected from the object to be scanned and output electrical signals corresponding to the detected light. The imaging devices may be arranged in two dimensions and may acquire a two-dimensional image by photographing once. Thus, the main camera module 60 may acquire a partial image of the object to be scanned by photographing frame by frame. The shape and size of a frame may be determined according to the image sensor and may generally have a rectangular shape.

The imaging devices may have various well-known configurations including charge coupled devices (CCD), complementary metal-oxide semiconductors (CMOS), etc.

The main camera module 60 may further include a lens that collects light onto the image sensor, a camera housing in which the image sensor and the lens are mounted, and a circuit board 65 for driving the image sensor.

At least one main camera module 60 may be provided. The main camera module 60 includes a first main camera module 61, a second main camera module 62, and a third main camera module 63 which are sequentially arranged from inside to outside in the radial direction. However, there may be only one main camera module or two main camera modules, and the number of main camera modules is not limited.

Because the main camera module 60 is installed at the rotational body 30 and rotates together with the rotational body 30, the main camera module 60 may make a rotational motion about the rotation axis X of the rotational body 30.

The main camera modules 61, 62, and 63 may be arranged in a line from the rotation axis X of the rotational body 30 in the radial direction. Paths outlined by each of the main camera modules 61, 62, and 63 making rotational motions may form concentric circles. The image sensors of the main camera modules 61, 62, and 63 may have the same sizes and the same number of pixels.

The preview camera module 70 may be installed on the rotation axis X of the rotational body 30. Thus, the preview camera module 70 may always be maintained in the same position even when the rotational body 30 rotates.

The driving unit 40 is provided to drive the rotational body 30. The driving unit 40 includes a motor 41 that converts an electric power into a mechanical rotational force and a power transfer member that transfers the rotational force generated by the motor 41 to the rotational body 30.

The motor 41 may include a fixed stator and a rotor that is provided to electromagnetically interact with the stator and rotate. The motor 41 may be mounted on a motor bracket 42 installed at a top surface 18a of the base portion 18.

The power transfer member includes various mechanical elements for power transfer including a belt, a chain, a pulley, a gear assembly, etc. In detail, the power transfer member may include a belt 43 connected to a motor shaft of the motor 41, a transfer gear 44 that is connected to the belt 43 and rotates, and a support gear 45 that is geared to the transfer gear 44 and rotates.

The transfer gear 44 may have a belt-wound portion 44a wound around the belt 43, a transfer gear teeth portion 44c geared to the support gear 45, and a connection portion 44b that connects the belt-wound portion 44a and the transfer gear teeth portion 44c.

The support gear 45 may be combined with the rotational body 30 and may be provided to transfer power and simultaneously support the rotational body 30. To this end, a through hole 46 may be formed in the support gear 45, a fastening hole 32 may be formed in the rotational body 30, and the support gear 45 and the rotational body 30 may be fastened to each other using a fastening member (S2 of FIG. 6).

The support gear 45 may have a first teeth portion 47 having teeth formed to be geared to the transfer gear 44 and a second teeth portion 48 having teeth formed to be geared to a sensing gear 105 of the angle sensing unit 100 that will be described later. The first teeth portion 47 and the second teeth portion 48 may form concentric circles with step heights with respect to each other.

Here, the sensing gear 105 of the angle sensing unit 100 may have a sensing gear teeth portion 106 geared to the second teeth portion 48 of the support gear 45 and an insertion shaft 108 inserted into a shaft accommodation portion 109a of a gear mount 109. Thus, when the support gear 45 is rotated, the sensing gear 105 may also be rotated by being engaged with the support gear 45. A connection pin 107 that transfers a rotational force to a variable resistor 101 may be formed in the sensing gear 105.

The support gear 45 may have a gear shaft portion 45a inserted into a connection opening 18c formed in the base portion 18, and bushings 51 and 52 may be combined with the gear shaft portion 45a, may support the support gear 45 to be rotated, and may reduce friction.

The bushings 51 and 52 may include a first bushing 51 combined with a bridge 19 and a second bushing 52 combined with the connection opening 18c of the base portion 18.

The support gear 45 may have a blocking portion 49 and a light passage opening 50 for responding to the home position sensing unit 110. The blocking portion 49 may prevent light emitted from an emitter 111 of the home position sensing unit 110 that will be described later from reaching a receiver 112. The light emitted from the emitter 111 may reach the receiver 112 through the light passage opening 50.

Through this configuration, the support gear 45 may be rotatably supported on the main body 10, and the rotational body 30 is combined with the support gear 45. As a result, the rotational body 30 may also be rotatably supported on the main body 10.

The rotational body 30 is provided to support the camera module 60 to be rotatable. The rotational body 30 may rotate by receiving power from the driving unit 40. The rotational body 30 has a shape of a lengthy extension from the rotation axis X in both directions. However, the shape of the rotational body 30 is not limited thereto, as long as the camera module 60 and the movable illumination unit 92 can be installed.

The rotational body 30 includes an illumination unit support portion (38 of FIG. 6) for installing the movable illumination unit 92. A through hole 38a through which a fastening member S3 passes may be formed in the illumination unit support portion 38, and the movable illumination unit 92 may be fastened to the rotational body 30 using the fastening member S3.

Figure 10:
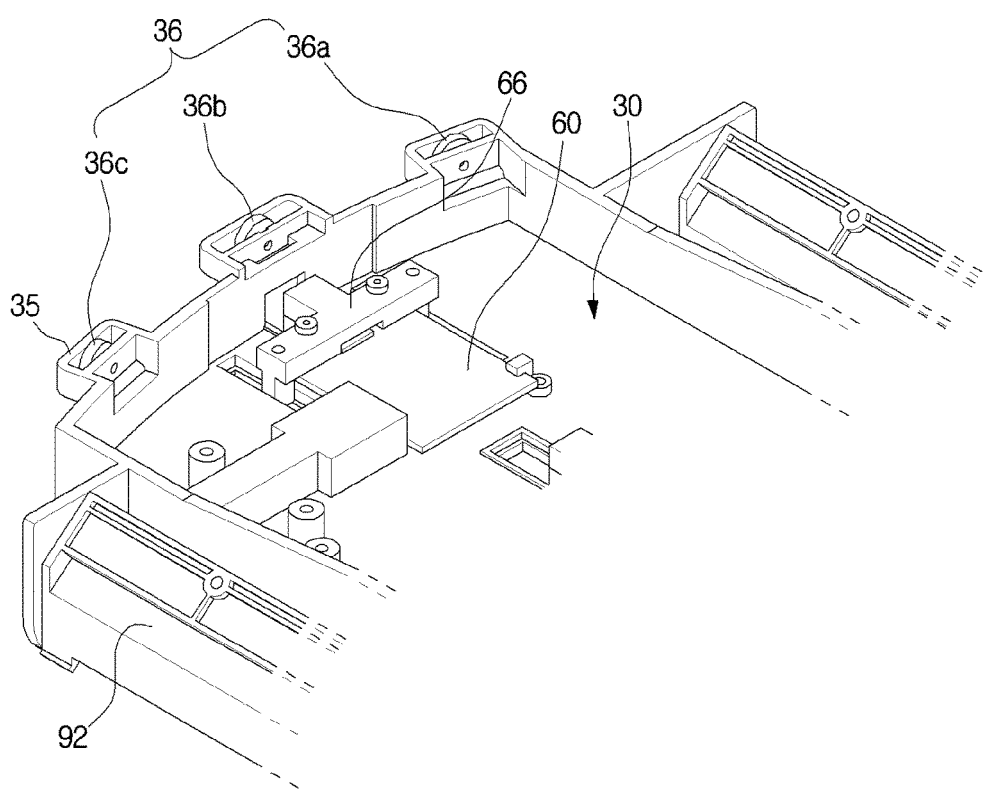
FIG. 10 is a view of a part of the rotational body of the image acquisition apparatus of FIG. 1.
Figure 11:
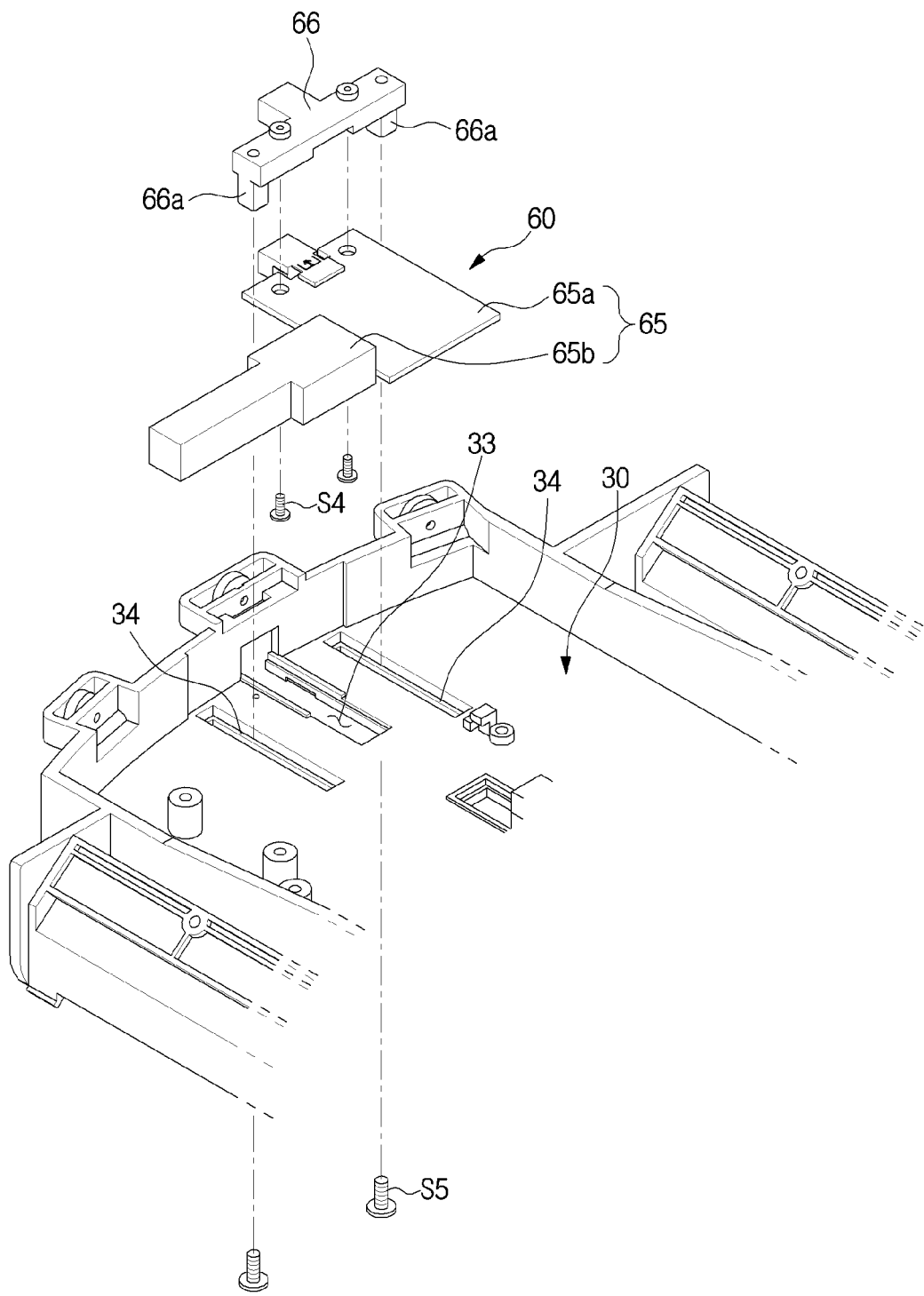
FIG. 11 is a view illustrating a main camera module that is separated from the rotational body of FIG. 10.
Figure 12:
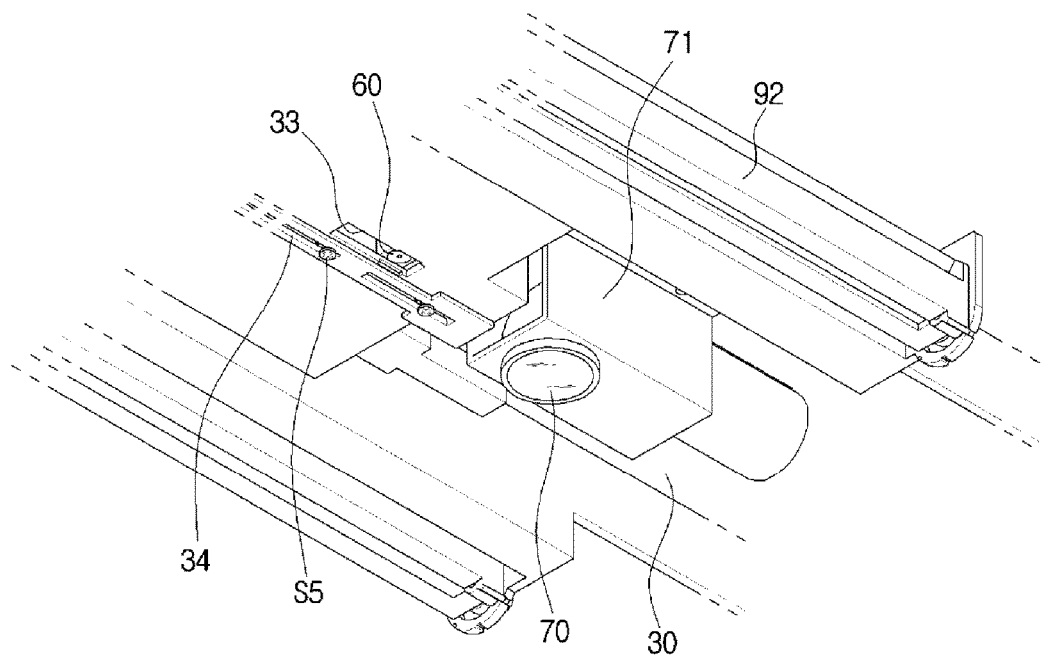
FIG. 12 is a view of a part of the bottom of the rotational body of the image acquisition apparatus of FIG. 1.
Figure 13:
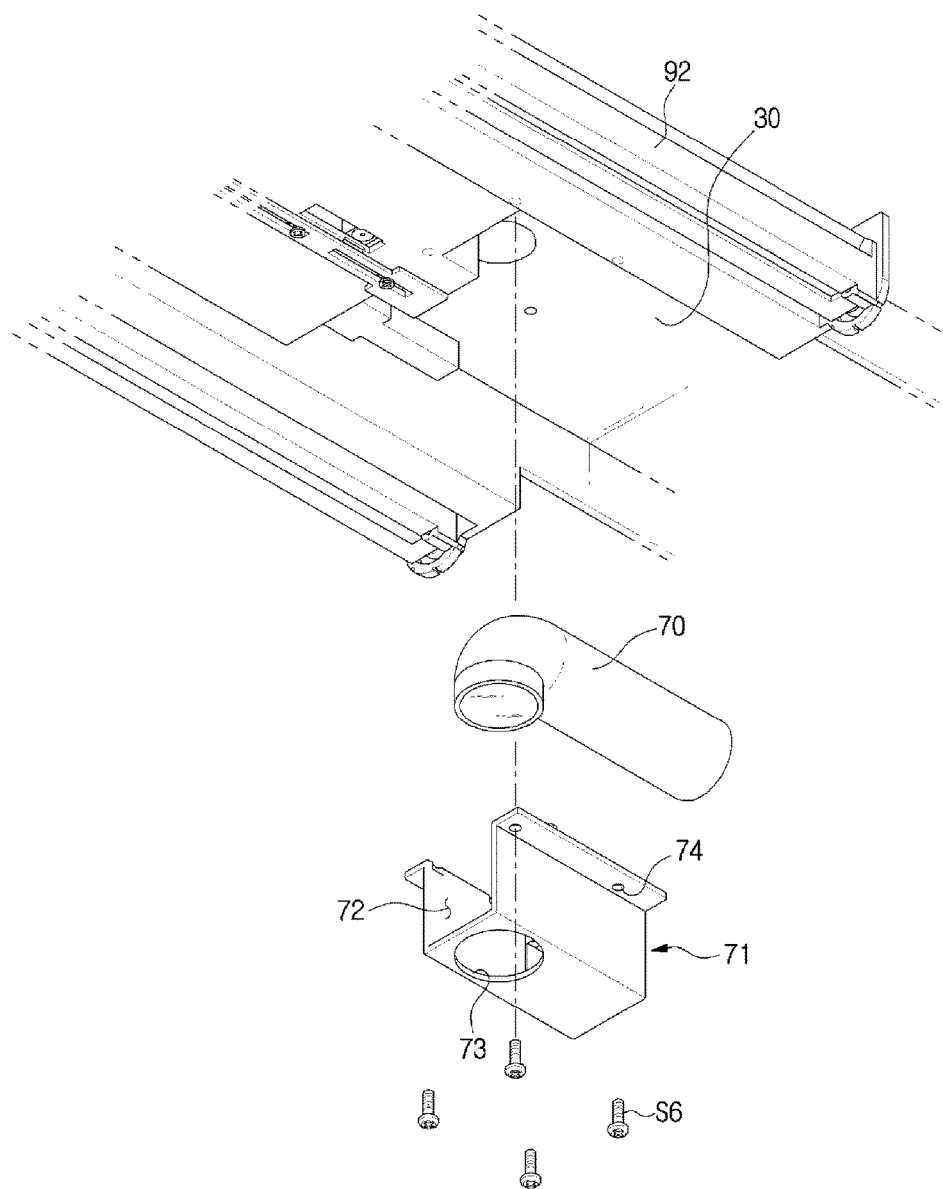
FIG. 13 is a view illustrating a preview camera module that is separated from the rotational body of FIG. 12.

FIG. 10 is a view of a part of the rotational body of the image acquisition apparatus of FIG. 1, FIG. 11 is a view illustrating a state of a main camera module that is separated from the rotational body of FIG. 10, FIG. 12 is a view of a part of the bottom of the rotational body of the image acquisition apparatus of FIG. 1, and FIG. 13 is a view illustrating a preview camera module that is separated from the rotational body of FIG. 12.

A structure in the rotational body 30 in which the camera modules 60 and 70 are installed will be described with reference to FIGS. 10 through 13.

The main camera module 60 is installed to be spaced apart a predetermined distance from the rotation axis X of the rotational body 30. As described above, the first main camera module 61, the second main camera module 62, and the third main camera module 63 may be installed in the rotational body 30 to be arranged in a line in the radial direction.

Structures of the installed first main camera module 61, second main camera module 62, and third main camera module 63 are the same, and thus only one thereof will be explained.

The main camera module 60 may include an image sensor assembly having an image sensor and the circuit board 65 that is combined with the image sensor assembly and controls the image sensor. The circuit board 65 may have a first portion 65a and a second portion 65b. The first portion 65a may have a flat plate shape, and the second portion 65b may have a shape of a rod that is thicker than the first portion 65a. The image sensor assembly may be combined with the first portion 65a.

The main camera module 60 may be installed at the top surface of the rotational body 30 so that an incident surface of the image sensor faces the stage 11. In order to install the main camera module 60 in the rotational body 30, a first fixed member 66 may be combined with the circuit board 65. The circuit board 65 and the first fixed member 66 may be fastened using a fastening member S4.

The first fixed member 66 may have a fixed protrusion 66a that is inserted into a coupling opening 34 formed in the rotational body 30 and combined with the coupling opening 34. After the fixed protrusion 66a is inserted into the coupling opening 34, a fastening member S5 may be fastened to the fixed protrusion 66a, and the main camera module 60 may be installed at the rotational body 30. A light incidence hole 33 may be formed in the rotational body 30 so that light reflected from the object to be scanned is incident on the image sensor of the main camera module 60.

However, this installation structure is just one example, and the main camera module 60 may be installed in the rotational body 30 using various methods.

As described above, the preview camera module 70 may be installed on the rotation axis X of the rotational body 30. The preview camera module 70 may include an image sensor, a wide lens that collects light in a wide coverage onto the image sensor, and a circuit board that controls the image sensor. The preview camera module 70 may have an approximately pipe shape.

The preview camera module 70 may be installed at a rear surface of the rotational body 30 so that an incident surface of the image sensor faces the stage 11. The preview camera module 70 may be installed in the rotational body 30 using a second fixed member 71.

The second fixed member 71 may have an accommodation portion 72 that accommodates the preview camera module 70, a module passage hole 73 through which a part of the preview camera module 70 passes so that light reflected from the object to be scanned is incident on the preview camera module 70, and a through hole 74 through which a fastening member S6 passes.

After the preview camera module 70 is accommodated by the accommodation portion 72 of the second fixed member 71, the second fixed member 71 and the rotational body 30 are fastened using the fastening member S6 so that the preview camera module 70 may be installed in the rotational body 30. However, this installation structure is just one example, and the preview camera module 70 may be installed in the rotational body 30 using various methods.

A roller member mounting portion 35 on which the roller member 36 is to be installed may be disposed at both ends of the rotational body 30 in the lengthwise direction. The roller member 36 makes a rolling motion on the above-described rail members 81 and 82 and allows the rotational body 30 to smoothly rotate. Three roller members 36a, 36b, and 36c are installed at both ends of the rotational body 30 in the lengthwise direction. However, positions and the number of roller members are not limited thereto.

Figure 14:
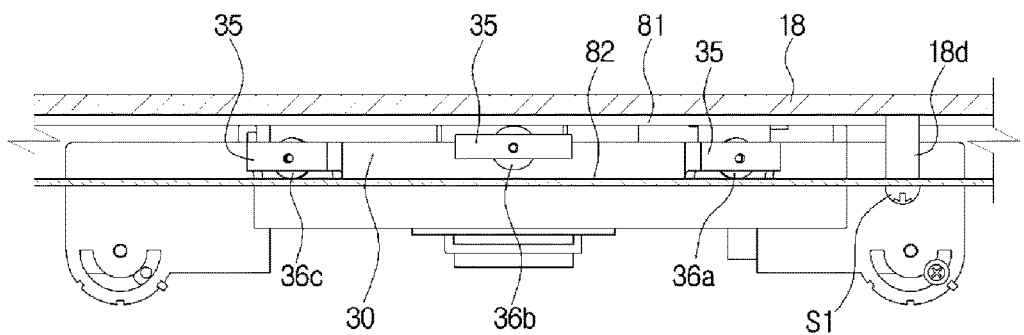
FIG. 14 is a view of a roller member and a rail member of the image acquisition apparatus of FIG. 1.
Figure 15:
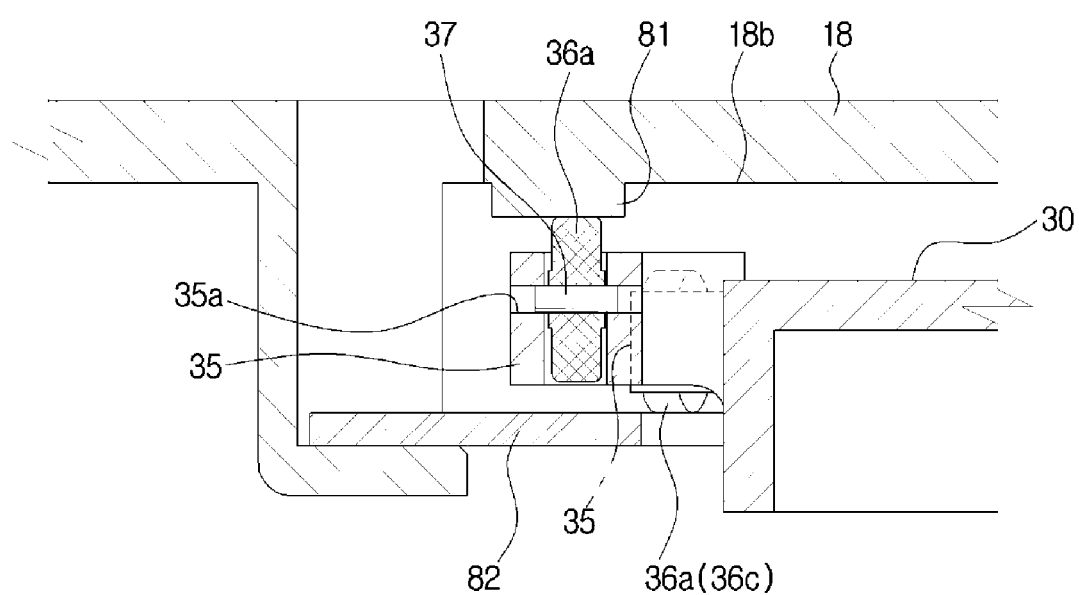
FIG. 15 is a view illustrating the roller member and the rail member of the image acquisition apparatus of FIG. 1 from a different angle.

FIG. 14 is a view of a roller member and a rail member of the image acquisition apparatus of FIG. 1, and FIG. 15 is a view illustrating the roller member and the rail member of the image acquisition apparatus of FIG. 1 from a different angle.

The roller member 36 and the rail members 81 and 82 will be described with reference to FIGS. 14 and 15.

The roller member 36 may include a roller rotation pin 37, and the roller rotation pin 37 may be inserted into a roller rotation pin accommodation portion 35a of the roller member mounting portion 35.

A first roller member 36a, a second roller member 36b, and a third roller member 36c may be installed at both ends of the rotational body 30 in the lengthwise direction. A part of the first roller member 36a, the second roller member 36b, and the third roller member 36c may be in contact with the first rail member 81, and the other part of the first roller member 36a, the second roller member 36b, and the third roller member 36c may be in contact with the second rail member 82.

For example, the first roller member 36a and the third roller member 36c may be in contact with the second rail member 82, and the second roller member 36b may be in contact with the first rail member 81. Through this structure, vibration of the rotational body 30 in the vertical direction may be effectively prevented, and the rotational body 30 may make smoother rotational motions.

As described above, the first rail member 81 may be formed as a single body with the base portion 18, and the second rail member 82 may be combined with a coupling boss portion 18d that protrudes from the bottom surface 18b of the base portion 18 through the fastening member S1.

Figure 16:
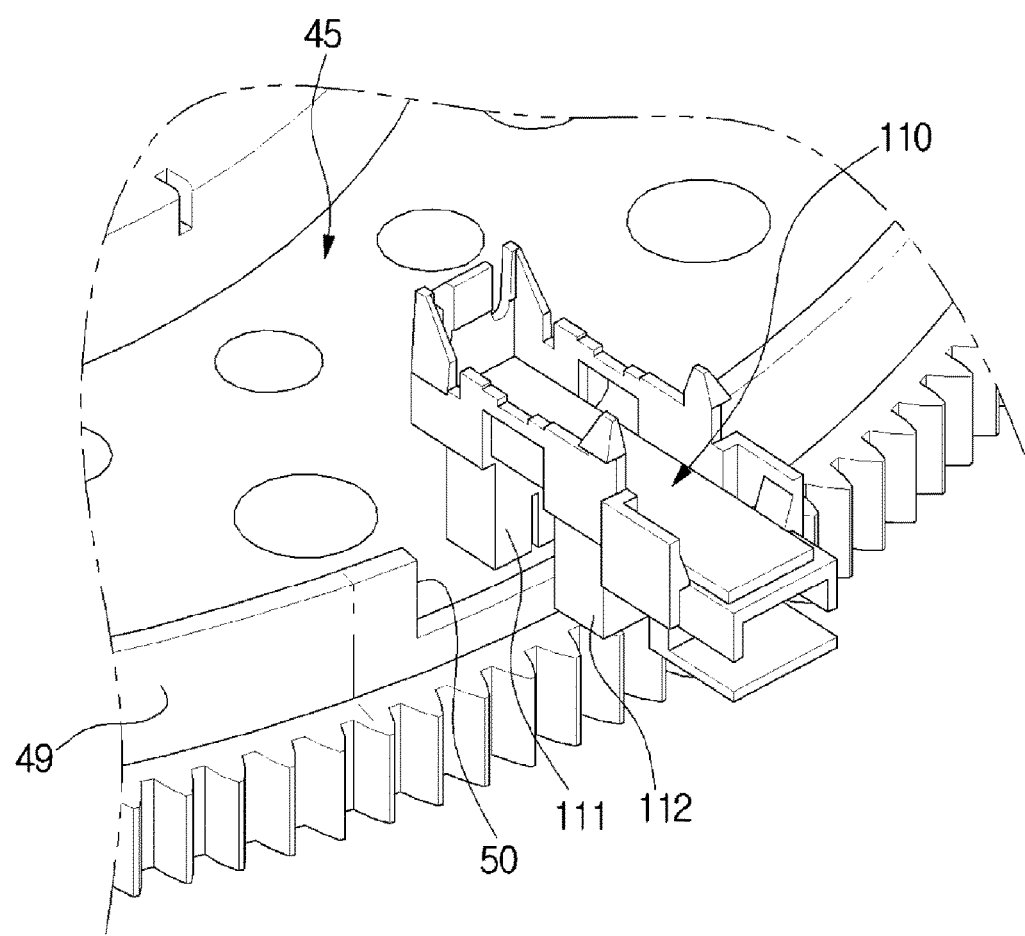
FIG. 16 is view of an angle sensing unit and a home position sensing unit of the image acquisition apparatus of FIG. 1.
Figure 17:
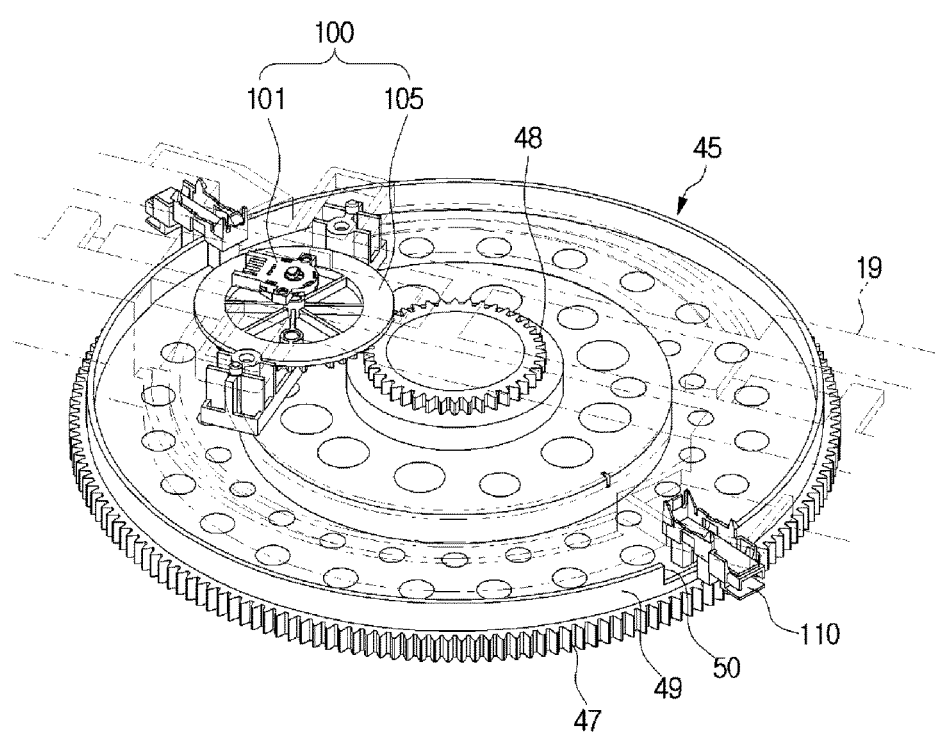
FIG. 17 is an exploded view of a detailed configuration of the angle sensing unit of the image acquisition apparatus of FIG. 1.
Figure 18:
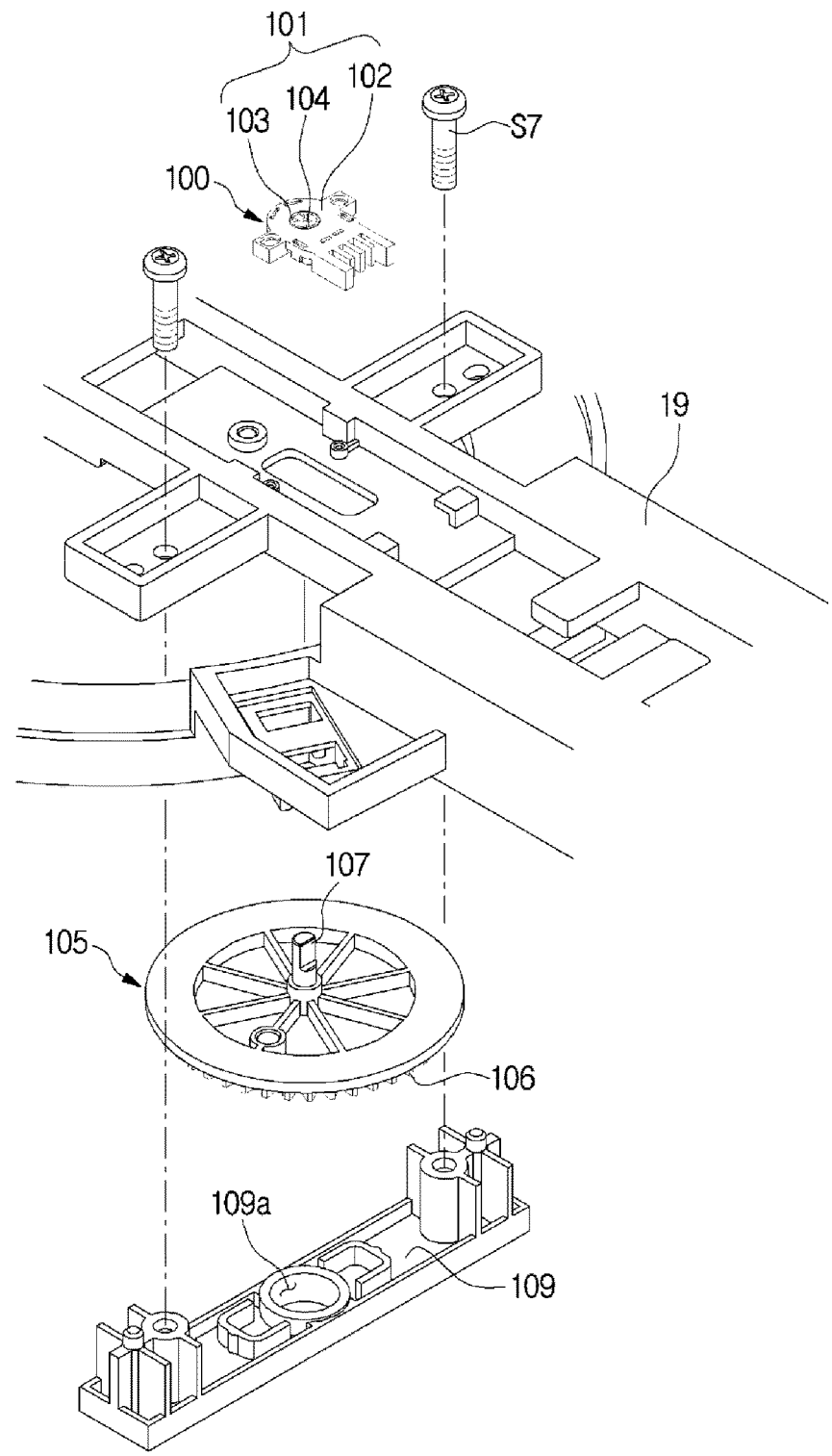
FIG. 18 is a view of the home position sensing unit of the image acquisition apparatus of FIG. 1.
Figure 25:
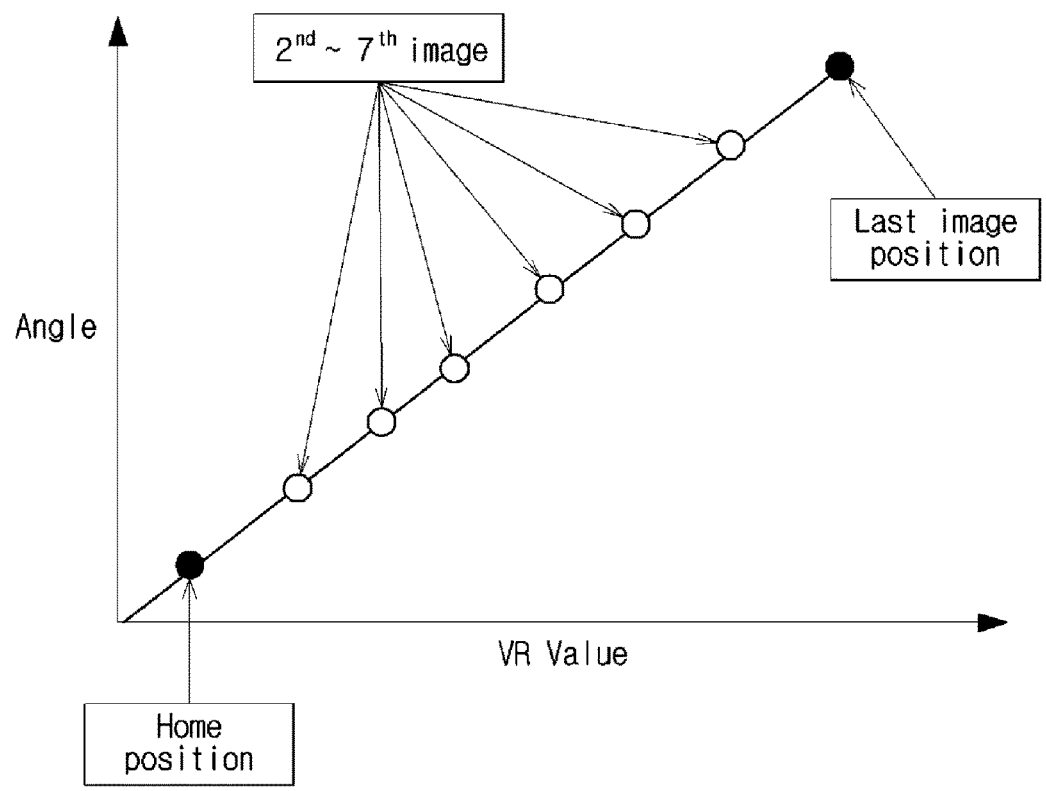
FIG. 25 is a view illustrating the relationship between an angle of the rotational body and a resistance value of a variable resistor of the angle sensing unit of the image acquisition apparatus of FIG. 1.

FIG. 16 is view of an angle sensing unit and a home position sensing unit of the image acquisition apparatus of FIG. 1. FIG. 17 is an exploded view of a detailed configuration of the angle sensing unit of the image acquisition apparatus of FIG. 1. FIG. 18 is a view of the home position sensing unit of the image acquisition apparatus of FIG. 1. FIG. 25 is a view illustrating the relationship between an angle of the rotational body and a resistance value of a variable resistor of the angle sensing unit of the image acquisition apparatus of FIG. 1.

The angle sensing unit 100 and the home position sensing unit 110 of the image acquisition apparatus 1 will be described with reference to FIGS. 16 through 18 and FIG. 25.

The angle sensing unit 100 senses an angle, i.e., rotational displacement of the rotational body 30. The angle sensing unit 100 may include a sensing gear 105 that rotates in line with a rotational motion of the rotational body 30 and a variable resistor 101 whose resistance value varies according to the rotational displacement of the sensing gear 105.

The sensing gear 105 includes an insertion shaft 108 inserted into the shaft accommodation portion 109a of the gear mount 109, a sensing gear teeth portion 106 geared to the second teeth portion 28 of the support gear 45, and a connection pin 107 that transfers a rotational force of the sensing gear 105 to the variable resistor 101.

After the insertion shaft 108 of the sensing gear 105 is accommodated by the shaft accommodation portion 109a of the gear mount 109, the gear mount 109 is combined with the bridge 19 so that the sensing gear 105 may be rotatably mounted on the bridge 19. The gear mount 109 may be fastened to the bridge 19 using a fastening member S7.

As described above, the support gear 45 is combined with the rotational body 30, and the second teeth portion 48 of the support gear 45 is geared to the sensing gear teeth portion 106 of the sensing gear 105. As a result, the sensing gear 105 may rotate in line with a rotational motion of the rotational body 30.

In this case, when the ratio of teeth of the second teeth portion 48 of the support gear 45 with respect to teeth of the sensing gear teeth portion 106 of the sensing gear 105 is set to 1:1, rotational displacement of the rotational body 30 and rotational displacement of the sensing gear 105 may be the same.

The variable resistor 101 may include a sensor body 102, a connection pin accommodation groove 104 into which the connection pin 107 of the sensing gear 105 is inserted and a rotation portion 103 rotatably disposed in the sensor body 102. The variable resistor 101 may output a resistance value according to rotational displacement of the rotation portion 103 with respect to the sensor body 102.

For example, the resistance value output by the variable resistor 101 may be directly proportional to rotational displacement, as illustrated in FIG. 25. Through this configuration, the angle sensing unit 100 may sense a rotational displacement of the rotational body 30.

The home position sensing unit 110 may sense whether the rotational body 30 is located in a home position. The image acquisition apparatus 1 may restore the rotational body 30 to the home position during a startup of the image acquisition apparatus 1 or when the image acquisition apparatus 1 is rebooted.

The home position sensing unit 110 may include a photointerrupter having an emitter 111 that emits light and a receiver 112 that receives light emitted from the emitter 111. The emitter 111 may include an LED that converts electrical signals into light signals, and the receiver 112 may include a phototransistor that converts light signals into electrical signals.

The blocking portion 49 that prevents light emitted from the emitter 111 from reaching the receiver 112 and the light passage opening 50 through which light emitted from the emitter 111 reaches the receiver 112 may be formed in the support gear 45 of the power transfer member.

The home position sensing unit 110 may be disposed to determine that the rotational body 30 is at the home position when light emitted from the emitter 111 reaches the receiver 112 through the light passage opening 50.

Figure 19:
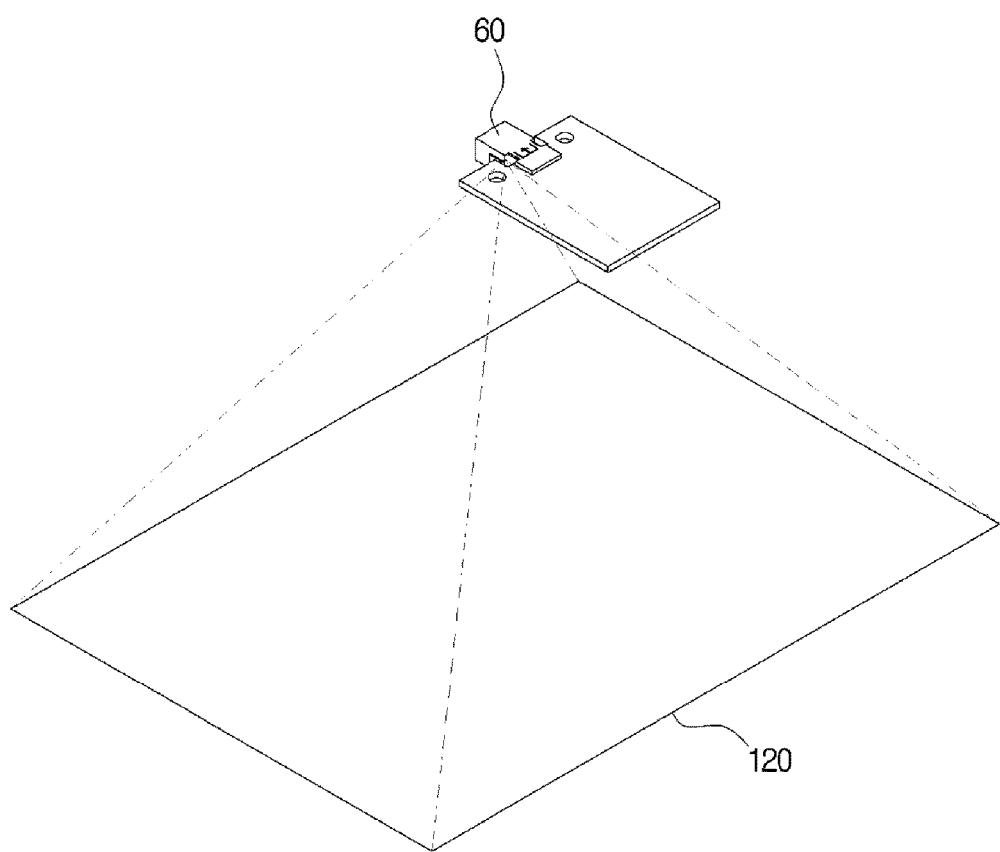
FIG. 19 is a view of the main camera module of the image acquisition apparatus of FIG. 1 and a photographing coverage thereof.
Figure 20:
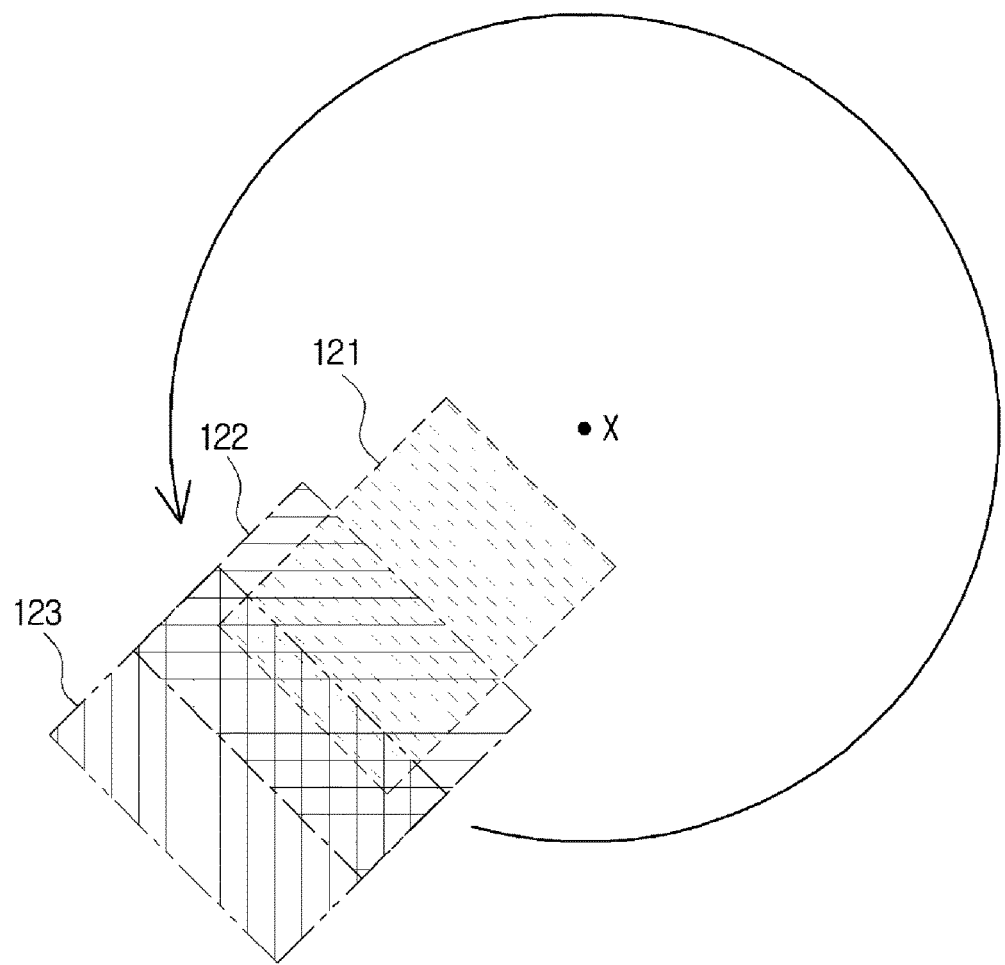
FIG. 20 is a view illustrating a photographing coverage of a plurality of main camera modules of the image acquisition apparatus of FIG. 1.
Figure 21:
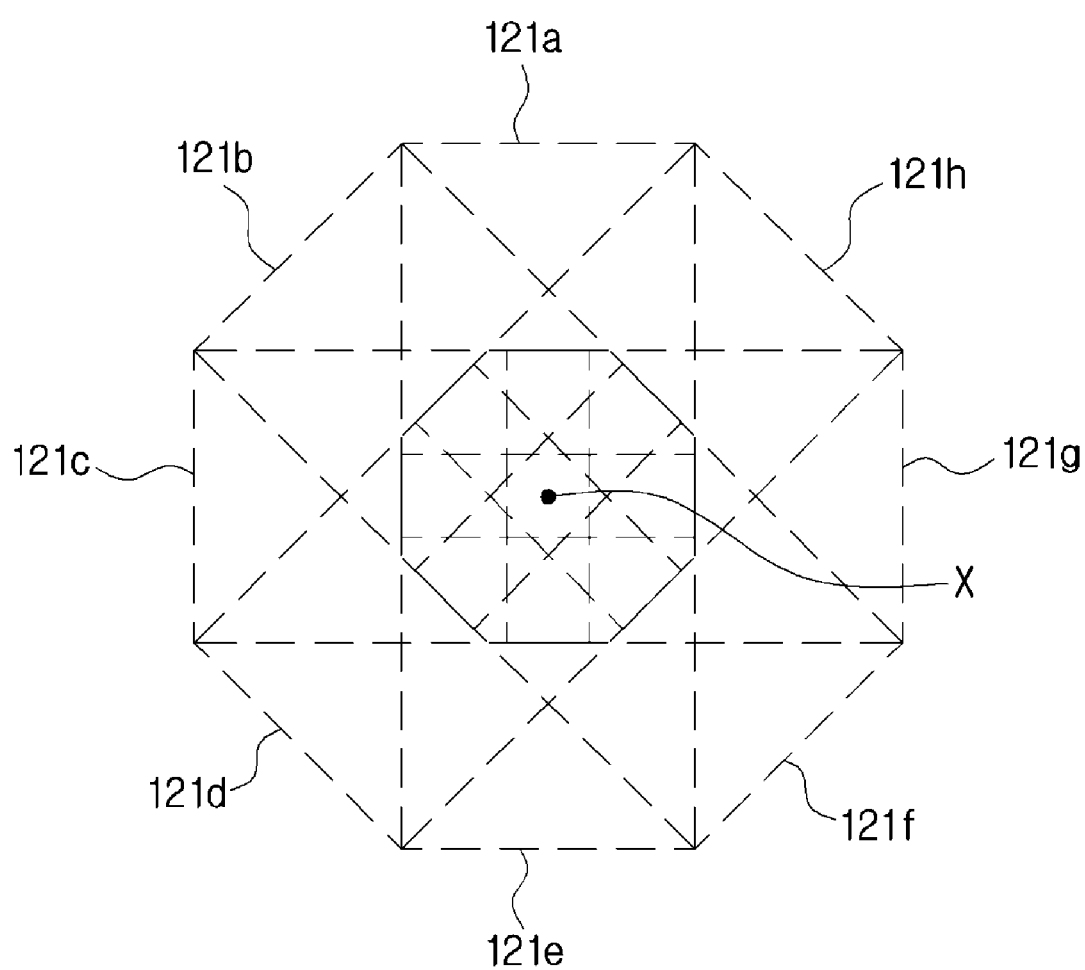
FIG. 21 is a view illustrating a photographing coverage of a first main camera module of the image acquisition apparatus of FIG. 1.
Figure 22:
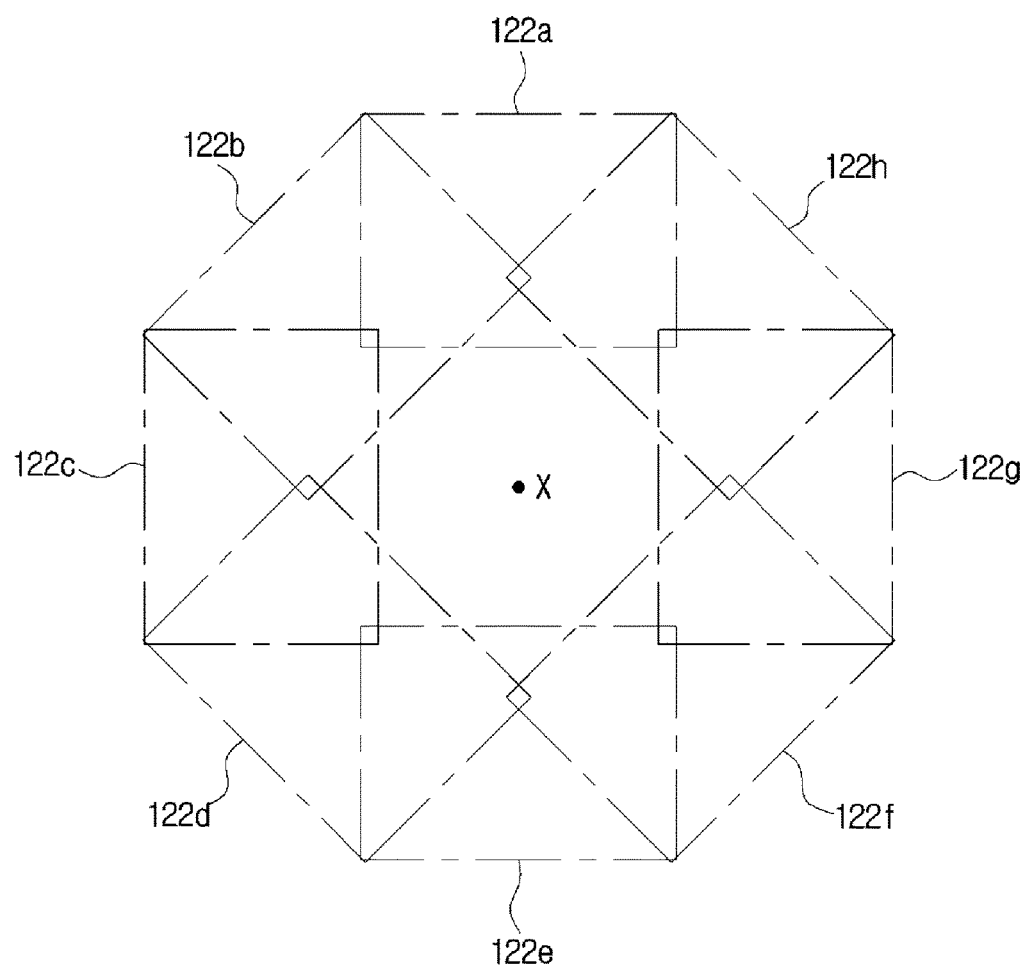
FIG. 22 is a view illustrating a photographing coverage of a second main camera module of the image acquisition apparatus of FIG. 1.
Figure 23:
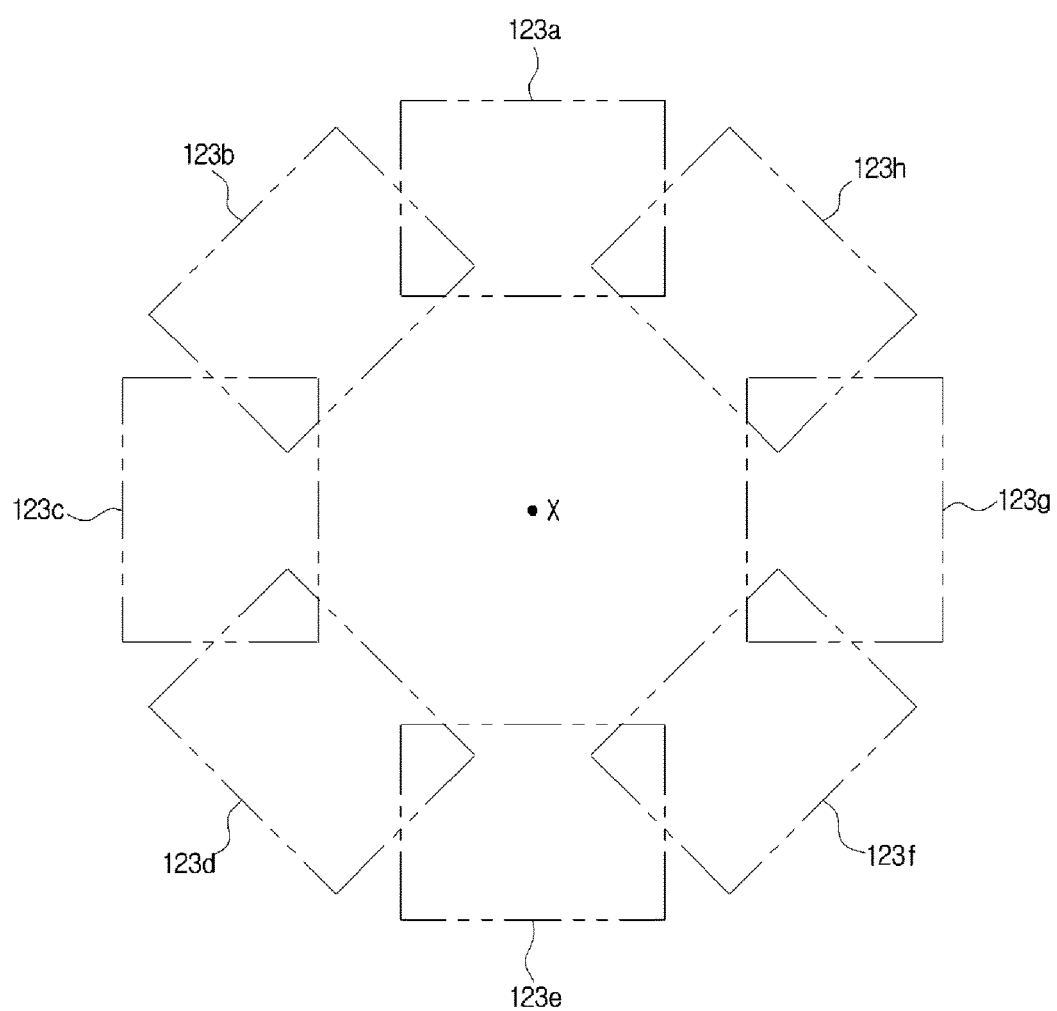
FIG. 23 is a view illustrating a photographing coverage of a third main camera module of the image acquisition apparatus of FIG. 1.
Figure 24:
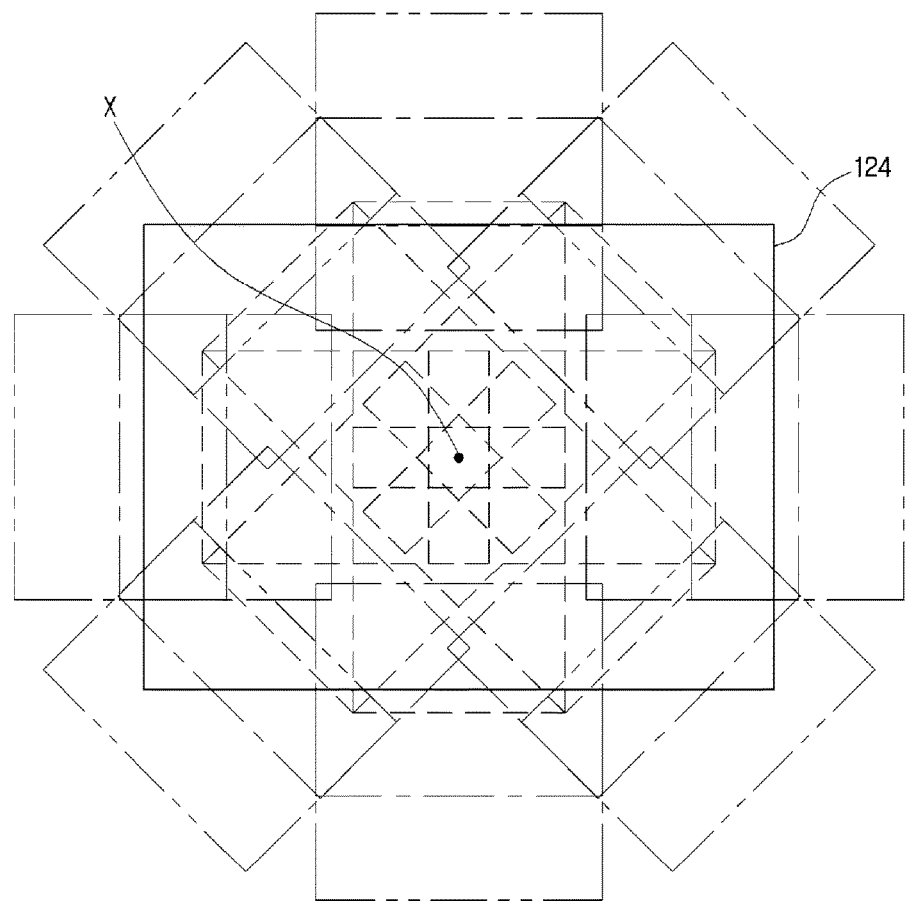
FIG. 24 is a view illustrating a synthesized image formed by an image processing unit of the image acquisition apparatus of FIG. 1.

FIG. 19 is a view of the main camera module of the image acquisition apparatus of FIG. 1 and a photographing coverage thereof, FIG. 20 is a view illustrating a photographing coverage of a plurality of main camera modules of the image acquisition apparatus of FIG. 1, FIG. 21 is a view illustrating a photographing coverage of a first main camera module of the image acquisition apparatus of FIG. 1, FIG. 22 is a view illustrating a photographing coverage of a second main camera module of the image acquisition apparatus of FIG. 1, FIG. 23 is a view illustrating a photographing coverage of a third main camera module of the image acquisition apparatus of FIG. 1, and FIG. 24 is a view illustrating a synthesized image formed by an image processing unit of the image acquisition apparatus of FIG. 1.

Referring to FIGS. 19 through 24, the main camera module 60 may have a two-dimensional photographing coverage 120 of a predetermined size. The photographing coverage 120 may have an approximately rectangular two-dimensional shape, i.e., a frame shape.

The main camera module 60 may acquire an image within the photographing coverage 120, i.e., a partial image of the entire image of the object on the stage 11 to be scanned. Here, the photographing coverage 120 and the image acquired in the photographing coverage 120 are naturally in a one-to-one correspondence.

As described above, because the first, second, and third main camera modules 61, 62, and 63 are arranged in radial directions from the rotation axis X, photographing coverages 121, 122, and 123 of the first, second, and third main camera modules 61, 62, and 63 may also be arranged in the radial directions, as illustrated in FIG. 20. In this case, at least a part of the photographing coverages 121, 122, and 123 may overlap one another. In this way, the photographing coverages 121, 122, and 123 overlap one another so that each of the partial images acquired in the photographing coverages 121, 122, and 123 may be combined using a stitching algorithm to synthesize and form the entire image.

While the rotational body 30 rotates in one direction from the home position toward a final position, each of the first, second, and third main camera modules 61, 62, and 63 may perform a photographing operation on the object to be scanned a plurality of times. For example, while the rotational body 30 rotates by 360 degrees in one direction, each of the first, second, and third main camera modules 61, 62, and 63 may perform a photographing operation on the object to be scanned every 45 degrees to acquire eight partial images.

In detail, while the rotational body 30 rotates by 360 degrees, the first main camera module 61 inside in the radial direction may acquire eight partial images corresponding to eight photographing coverages 121a through 121h, as illustrated in FIG. 21.

Also, the middle, second main camera module 62 may acquire eight partial images corresponding to eight photographing coverages 122a through 122h, as illustrated in FIG. 22, and the third main camera module 63 outside in the radial direction may acquire eight partial images corresponding to eight photographing coverages 123a through 123h, as illustrated in FIG. 23.

Thus, the number of partial images acquired by the three main camera modules 61, 62, and 63 may be 24, and the entire image (124 of FIG. 24) of the object to be scanned may be included in a union of the 24 partial images.

If each of the first, second, and third main camera modules 61, 62, and 63 has 13 megapixel and each of the photographing coverages 121, 122, and 123 is approximately 178.14 mm*132.08 mm, an image acquired by each of the first, second, and third main camera modules 61, 62, and 63 has approximately 600 dpi resolution. The entire image 124 having the same 600 dpi resolution may have a larger size than that of an image acquired by each of the first, second, and third main camera modules 61, 62, and 63.

That is, the image acquisition apparatus 1 may acquire an image having no lowered resolution and having a larger size than that of an image that may be acquired by each of the first, second, and third main camera modules 61, 62, and 63 without lowering of resolution.

In detail, an image having a dimension of A3 (420*297 mm) may be acquired with 600 dpi resolution using three main camera modules 61, 62, and 63 each having 13 megapixel.

When the rotational body 30 reaches the final position, the rotational body 30 may be controlled to rotate in the opposite direction to be restored to the home position.

The image acquisition apparatus 1 includes an image processing unit (145 of FIG. 27) that synthesizes partial images acquired by each of the main camera modules 61, 62, and 63 for forming a synthesized image.

The image processing unit 145 may store the partial images acquired by each of the main camera modules 61, 62, and 63 and may combine the partial images using the stitching algorithm to form a synthesized image.

The stitching algorithm may include, for example, procedures including lens distortion correction, energy mapping, image transformation, tone correction, etc.

Figure 26:
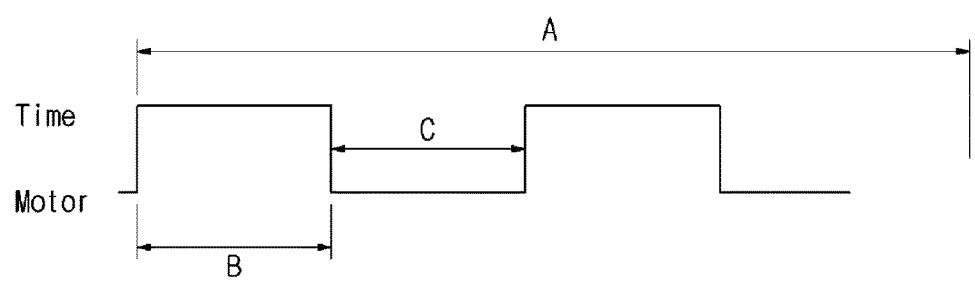
FIG. 26 is a view illustrating a method of a time-dependent control of a motor of the image acquisition apparatus of FIG. 1.
Figure 27:
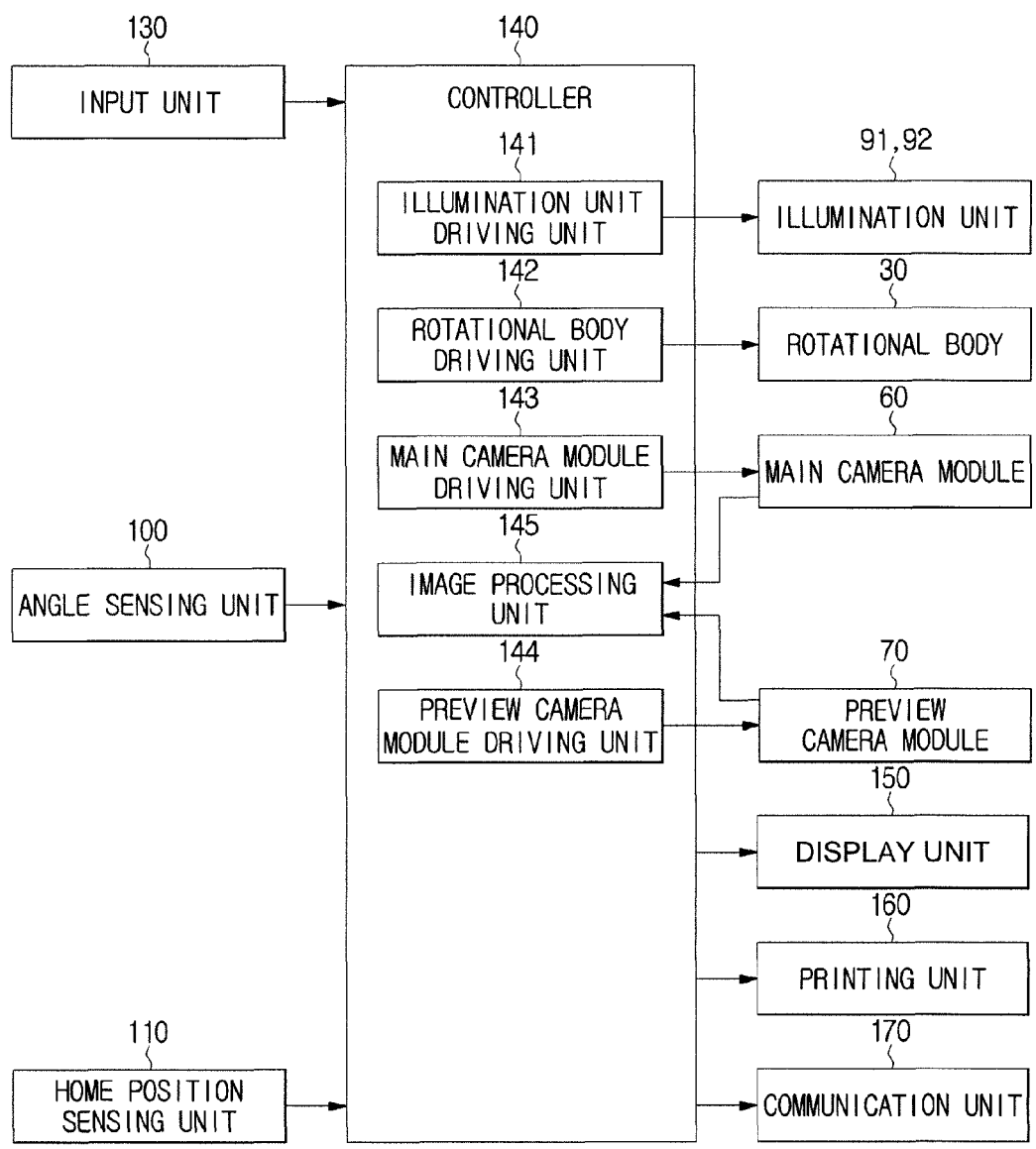
FIG. 27 is a control block diagram of the image acquisition apparatus of FIG. 1.

FIG. 25 is a view illustrating the relationship between an angle of the rotational body and a resistance value of a variable resistor of the angle sensing unit of the image acquisition apparatus of FIG. 1, FIG. 26 is a view illustrating a method of a time-dependent control of a motor of the image acquisition apparatus of FIG. 1, and FIG. 27 is a control block diagram of the image acquisition apparatus of FIG. 1.

A method of controlling an image acquisition apparatus in accordance with an embodiment of the present disclosure will be described with reference to FIGS. 25 to 27.

The image acquisition apparatus 1 includes an input unit 130 to which an operating instruction of the image acquisition apparatus 1 is input, the angle sensing unit 100 that senses rotational displacement of the rotational body 30, the home position sensing unit 110 that senses whether the rotational body 30 is at the home position, the illumination units 91 and 92 that irradiate light on an object to be scanned, the main camera module 60 and the preview camera module 70 that acquire images of the object to be scanned, a display unit 150 that displays the image formed by the image processing unit 145 using a display, etc., and a controller 140 that receives various signals from the input unit 130, the angle sensing unit 100, and the home position sensing unit 110 and controls the illumination unit 91, the rotational body 30, and the camera modules 60 and 70.

The controller 140 includes an illumination unit driving unit 141 that controls turn-on and turn-off of the illumination units 91 and 92, a rotational body driving unit 142 that controls the rotational motion of the rotational body 30, a main camera module driving unit 143 and a preview camera module driving unit 144 that control photographing of the main camera module 60 and the preview camera module 70, and an image processing unit 145 that stores and processes images acquired by the main camera module 60 and the preview camera module 70.

The controller 140 may move the rotational body 30 to the home position when power is supplied to the controller 140.

When a preview scan instruction is input to the controller 140 through the input unit 130, the controller 140 operates the preview camera module 70 after the rotational body 30 moves to the home position, may acquire the preview image of the entire object to be scanned and display on the display unit 150.

When a scan instruction is input to the controller 140 through the input unit 130, the controller 140 may rotate the rotational body 30 in one direction from the home position toward the final position. The controller 140 may operate the main camera module 60 a plurality of times when the rotational body 30 rotates in one direction from the home position toward the final position so as to acquire a plurality of partial images.

For example, the controller 140 may operate the main camera module 60 every 45 degrees while the rotational body 30 rotates by 360 degrees and may photograph the object to be scanned eight times. In this case, as illustrated in FIG. 25, a rotational angle of the rotational body 30 may correspond to the resistance value of the variable resistor 101 of the angle sensing unit 100. The rotational angle of the rotational body 30 may be directly proportional to the resistance value of the variable resistor 101.

That is, the controller 140 may operate the main camera module 60 whenever the resistance value of the variable resistor 101 output by the angle sensing unit 100 becomes a predetermined value.

The controller 140 may stop the motion of the rotational body 30 while the main camera module 60 performs a photographing operation to allow the main camera module 60 to perform a photographing operation without shaking.

That is, the controller 140 may on-off control driving of the motor 41 of the driving unit 40, as illustrated in FIG. 26. After the motor 41 is driven for an operating time B of the entire time A at which the rotational body 30 rotates in one direction from the home position toward the final position, the motor 41 may be stopped for a stopping time C. The operating time B and the stopping time C may be repeated during the entire time A.

When the controller 140 reaches the final position, the controller 140 may rotate the rotational body 30 in the opposite direction and may restore the rotational body 30 to the home position. That is, when the rotational body 30 reaches the final position, the controller 140 may control the motor 41 to be rotated in reverse.

Furthermore, the image acquisition apparatus 1 includes a printing unit 160 that prints the image formed by the image processing unit 145 on a printing medium and a communication unit 170 that transmits the image via a communication network including a wired communication network, a wireless communication network, etc. In this case, the image acquisition apparatus 1 includes an image forming apparatus.

The printing unit 160 may print the image on the printing medium by ejecting and radiating ink of minor liquid droplets in a desired position of the printing medium and may print the image by supplying a toner to an electrostatic latent image formed by scanning light onto a photosensitive body and then by transferring the electrostatic latent image with the toner onto the printing medium.

The wired communication network may be configured using various cables, such as a pair cable, a coaxial cable, an optical fiber cable or an Ethernet cable, and the wireless communication network may be implemented using a local area communication standard, such as a wireless fidelity (Wi-Fi) standard technology, or a mobile communication standard, such as a $3^{rd}$ generation (3GPP)-based wireless communication technology, such as long term evolution (LTE).

According to the spirit of the present disclosure, an image with high resolution can be acquired from an object.

According to the spirit of the present disclosure, an image with high resolution can be acquired from an object and can be printed on a printing medium.

According to the spirit of the present disclosure, a structure of a driving unit for driving a camera module that acquires an image of an object, can be simple, and controlling of the driving unit can be easily performed.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An image acquisition apparatus comprising:
   a main body having a stage configured to support an object;
   a preview camera module provided above the stage and configured to acquire a preview image of the object supported on the stage;
   at least one main camera module provided above the stage and configured to rotate, about a rotation axis substantially orthogonal to the stage, to acquire a plurality of partial images of the object supported on the stage, the partial images respectively corresponding to different rotational positions of the at least one main camera module; and at least one processor configured to produce an image of the object by synthesizing the acquired plurality of partial images of the object, wherein at least a portion of each partial image of the plurality of partial images acquired by the at least one main camera module overlaps another partial image of the plurality of partial images.

2. The image acquisition apparatus according to claim 1, comprising:
a rotational body rotatably provided above the stage to support the at least one main camera module; and
a driver configured to generate a driving force to drive the rotational body.

3. The image acquisition apparatus according to claim 2, wherein the stage comprises a support surface to support the object, and a rotation axis of the rotational body is perpendicular to the support surface.

4. The image acquisition apparatus according to claim 2, wherein, the rotational body rotates in one direction from a home position toward a final position, and when the rotational body reaches the final position, the rotational body rotates in an opposite direction to return to the home position.

5. The image acquisition apparatus according to claim 4, wherein, while the main camera module is acquiring the plurality of partial images of the object, the rotational body is stopped.

6. The image acquisition apparatus according to claim 1, wherein each of the preview camera module and the at least one main camera module comprises a two-dimensional image sensor in which imaging devices for detecting light are arranged in two dimensions.

7. The image acquisition apparatus according to claim 2, wherein the driver comprises a motor configured to generate a rotational force and a power transfer member configured to transfer the generated rotational force of the motor to the rotational body.

8. The image acquisition apparatus according to claim 2, wherein the main body comprises a base portion provided above the stage to support the rotational body.

9. The image acquisition apparatus according to claim 2, comprising a rail member configured to guide a rotational motion of the rotational body.

10. The image acquisition apparatus according to claim 9, comprising a roller member installed on the rotational body and configured to roll on the rail member.

11. The image acquisition apparatus according to claim 2, comprising an angle sensor configured to sense a rotational angle of the rotational body and a home position sensor configured to sense whether the rotational body is located at a home position.

12. An image acquisition apparatus comprising:
a stage having a support surface configured to support an object;
a rotational body configured to rotate above the stage about a rotation axis perpendicular to the support surface; and
at least one main camera module installed at an eccentric position with respect to the rotation axis of the rotational body and configured to acquire a plurality of partial images of the object by photographing portions of the object supported on the stage respectively corresponding to different rotational positions of the rotational body,
wherein at least a portion of each partial image of the plurality of partial images acquired by the at least one main camera module overlaps another partial image of the plurality of partial images.

13. The image acquisition apparatus according to claim 12, wherein the at least one main camera module comprises a plurality of main camera modules, and the plurality of main camera modules are arranged in a radial direction.

14. The image acquisition apparatus according to claim 13, wherein each of the plurality of main camera modules is configured to acquire a portion of the plurality of partial images.

15. The image acquisition apparatus according to claim 12, comprising a preview camera module configured to acquire a preview image of the object by photographing the entire object facing the preview camera module at once.

16. The image acquisition apparatus according to claim 15, wherein the preview camera module is installed on the rotation axis of the rotational body.

17. An image forming apparatus comprising:
a stage configured to support an object;
a camera module that is rotatably provided above the stage, configured to rotate, about a rotation axis substantially orthogonal to the stage, and is configured to acquire a plurality of partial images of the object by photographing a portion of the object at a time respectively corresponding to different rotational positions of the camera module;
at least one processor configured to form a synthesized image by synthesizing the plurality of partial images acquired by the camera module; and
a printer configured to print the synthesized image formed by the at least one processor on a recording medium,
wherein at least a portion of each partial image of the plurality of partial images acquired by the camera module overlaps another partial image of the plurality of partial images.

18. The image forming apparatus according to claim 17, comprising a rotational body in which the camera module is installed and rotatably provided.

19. The image forming apparatus according to claim 18, comprising a driver configured to control a rotational motion of the rotational body.

* * * * *